(12) United States Patent
Mizumura et al.

(10) Patent No.: US 8,191,583 B2
(45) Date of Patent: Jun. 5, 2012

(54) HYDROFORMED PRODUCT

(75) Inventors: Masaaki Mizumura, Tokyo (JP);
Yukihisa Kuriyama, Tokyo (JP)

(73) Assignee: Nippon Steel Corporation, Tokyo (JP)

( * ) Notice: Subject to any disclaimer, the term of this patent is extended or adjusted under 35 U.S.C. 154(b) by 145 days.

(21) Appl. No.: 12/450,925

(22) PCT Filed: Apr. 18, 2008

(86) PCT No.: PCT/JP2008/057993
§ 371 (c)(1),
(2), (4) Date: Nov. 19, 2009

(87) PCT Pub. No.: WO2008/130056
PCT Pub. Date: Oct. 30, 2008

(65) Prior Publication Data
US 2010/0122748 A1    May 20, 2010

(30) Foreign Application Priority Data
Apr. 18, 2007   (JP) .................................. 2007-109641

(51) Int. Cl.
*F16L 9/00* (2006.01)
*B21D 39/20* (2006.01)
(52) U.S. Cl. ................. 138/177; 138/178; 72/58; 72/62
(58) Field of Classification Search .................. 138/177, 138/178; 72/55–58, 61, 62
See application file for complete search history.

(56) References Cited

U.S. PATENT DOCUMENTS

| | | | | |
|---|---|---|---|---|
| 2,837,810 A | * | 6/1958 | Ekholm | 29/890.149 |
| 5,735,156 A | * | 4/1998 | Yoshitomi et al. | 72/57 |
| 5,799,524 A | * | 9/1998 | Schafer et al. | 72/55 |
| 5,953,945 A | * | 9/1999 | Horton | 72/58 |
| 6,065,502 A | * | 5/2000 | Horton | 138/177 |
| 7,293,442 B1 | * | 11/2007 | Ghiran et al. | 72/55 |
| 7,337,641 B1 | * | 3/2008 | Bruggemann | 72/58 |
| 2009/0255308 A1 | * | 10/2009 | Ghiran et al. | 72/61 |
| 2011/0062155 A1 | * | 3/2011 | Walther et al. | 220/86.2 |

FOREIGN PATENT DOCUMENTS

| | | |
|---|---|---|
| JP | 8-192238 | 7/1996 |
| JP | 9-271857 | 10/1997 |
| JP | 10-85870 | 4/1998 |
| JP | 2001-212629 | 8/2001 |
| JP | 2002-153917 | 5/2002 |
| JP | 2002-100318 | 10/2003 |
| JP | 2004-268068 | 9/2004 |
| JP | 2006-006693 | 7/2007 |

OTHER PUBLICATIONS

International Search Report dated Jul. 22, 2008 issued in corresponding PCT Application No. PCT/JP2008/057993.
Y. Kuriyama, "*Tube Hydroforming*," Journal of the Japan Society for Technology of Plasticity 45(524): 715-720 (2004).

* cited by examiner

*Primary Examiner* — Patrick F Brinson
(74) *Attorney, Agent, or Firm* — Kenyon & Kenyon LLP

(57) ABSTRACT

A hydroformed product obtained by integrally working a metal pipe material by cold plastic working, which product (x) has a bent part at least at one location, (y1) has, at least at one location of the bent part, an expanded part of dimensions of a direction toward the outer side (or inner side) of the bend in a cross-section vertical to a pipe axis and a direction vertical to that direction of at least 1.35× of a circle equivalent diameter of an end of the metal pipe, and (z1) has an inner side (outer side) of the bent part of substantially the same radius of curvature.

4 Claims, 24 Drawing Sheets

Fig.10
(a) 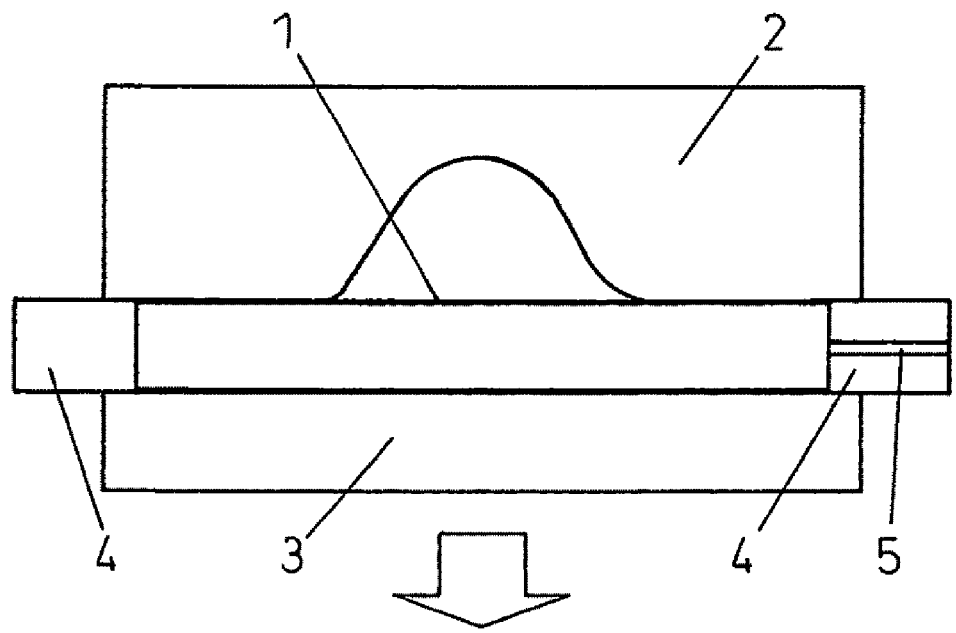
(b) 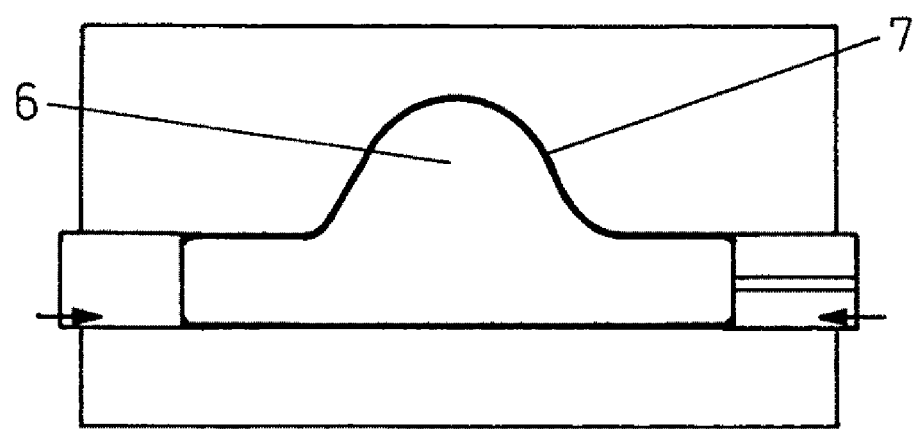

HYDROFORMED PRODUCT

This application is a national stage application of International Application No. PCT/JP2008/057993, filed 18 Apr. 2008, which claims priority to Japanese Application No. 2007-109641, filed 18 Apr. 2007, which is incorporated by reference in its entirety.

TECHNICAL FIELD

The present invention relates to a worked part used for a suspension part, body part, etc. for an automobile obtained by shaping a metal pipe material by hydroforming.

BACKGROUND ART

In recent years, in the automobile industry, metal pipe is increasingly being used as one means for reducing weight. Hollow metal pipe, compared with a solid material, offers the same rigidity while enabling the cross-sectional area to be reduced.

Further, an integral structure of metal pipe, compared with a T-shaped structure obtained by welding two metal plates, enables a reduction of weight by the elimination of the need for a welded flange part.

However, auto parts are placed in narrow spaces in the automobiles. Therefore, metal pipe is seldom used as is as a straight pipe. It is almost always attached after being secondarily worked.

As secondary working, bending is used most often, but in recent years the increasing complexity of the shapes of auto parts has led to an increase in hydroforming (fastening a metal pipe in a mold and, in that state, using inside pressure and axial direction compression to work the pipe into the mold shape) as well and, further, an increase in working comprised of these working processes overlaid.

Hydroforming itself, as shown in FIG. 1 (see *Sosei [Plasticity]* and *Kakou [Working]*, Vol. 45, No. 524 [2004], p. 715), compared with the simple T-forming, is being used for increasingly complex shapes in recent years. The pipe expansion rates (ratio of circumferential length of product pipe to circumferential length of stock pipe) have also been increasing.

Japanese Patent Publication (A) No. 2002-100318 discloses the method of obtaining a straight shaped hydroformed product with a large pipe expansion rate. However, this method is a method of expanding a metal pipe in one direction, then expanding it in a direction at right angles to this direction. It cannot be applied to working including bending.

Japanese Patent Publication (A) No. 2002-153917 and Japanese Patent Publication (A) No. 2006-006693 disclose a method of obtaining a worked part of a shape including bending and with a large pipe expansion rate.

The method described in Japanese Patent Publication (A) No. 2002-153917 is a method of using a movable mold to obtain a hydroformed product having a high branch pipe height. This can be used for cases of expansion in only one direction like with forming a branch pipe. Expansion in a direction at a right angle to that is not possible.

The method described in Japanese Patent Publication (A) No. 2006-006693 is a method of hydroforming, then rotary draw bending, but this method also can be applied to the case of expansion in only one direction. It does not enable expansion in a direction at a right angle to that.

The method described in Japanese Patent Publication (A) No. 8-192238 is the method of forming a hydroformed part with a bent part expanded in one direction and a direction vertical to that.

In this method, at a first step, the pipe is expanded concentrically, so even in the final shape, the result is a shape expanded to both of the outer side and inner side of the bend.

However, as explained above, auto parts have to be arranged in narrow spaces inside an automobile. It is not always necessary to expand the pipe to the outer side and inner side of the bend.

Conversely, to avoid interference with other parts, sometimes the inner side of the bend is hard to expand or the outer side of the bend is hard to expand. In such a case, the method described in Japanese Patent Publication (A) No. 8-192238 cannot be applied.

That is, in the conventional hydroforming method, when trying to increase the pipe expansion rate of the bent part, either the pipe was expanded in just one direction or the pipe was expanded across the entire circumference including the outer side and inner side of the bend.

For this reason, inherently, there was the problem that it was not possible to use hydroformed parts, which contribute to lighter weight, for suspension parts and other structural members of automobiles arranged in restricted spaces.

Further, plastic working other than hydroforming, for example, bending, cannot be used to work a structural member of the above shape. If using casting, it is possible to obtain a structural member of the above-mentioned shape, but a cast part is inferior to a plastic worked part in toughness, weldability, etc., so cannot be used for a suspension part, body part, or other auto part mentioned at the start.

In addition, it is possible to provide a heat treatment step during the bending or hydroforming to repeatedly eliminate the work strain caused in the previous step and finally obtain a greatly deformed worked part.

However, if providing a heat treatment step, (a) the production costs rise, (b) the production efficiency falls, (c) a dedicated facility for heat treatment of the complicatedly shaped part after working becomes necessary, (d) the heat treatment causes formation of scale at the surface of the part, (e) the effect of work hardening is reduced, etc. Numerous disadvantages accrue.

DISCLOSURE OF THE INVENTION

As explained above, in the past, there was never any worked product obtained by cold plastic working a metal pipe material with a large amount of expansion at a bent part and, further, no expanded part at either the inner side or outer side of the bent part.

Therefore, the present invention has as its object the provision of a hydroformed product obtained by cold plastic working a metal pipe material which (x) has a bent part at least at one location and (y) has at least one location of a bent part where the cross-section of the metal pipe is greatly expanded in one direction and a direction vertical to that direction compared with the original metal pipe and, (z) is not expanded at either the inner side or the outer side of the bent part.

The present invention for achieving the above object has as its gist the following:

(1) A hydroformed product obtained by integrally working a metal pipe material by cold plastic working, which product (x) has a bent part at least at one location, (y1) has, at least at one location of the bent part, an expanded part of dimensions of a direction toward the outer side of the bend in a cross-section vertical to a pipe axis and a direction vertical to that direction of at least 1.35× of a circle equivalent diameter of an end of the metal pipe, and (z1) has an inner side of the bent part of substantially the same radius of curvature.

(2) A hydroformed product as set forth in (1), characterized in that in the shape of the inner side of the bent part, a (maximum value of radius of curvature−minimum value of radius of curvature)/minimum value of radius of curvature is 50% or less.

(3) A hydroformed product obtained by integrally working a metal pipe material by cold plastic working, which product (x) has a bent part at least at one location, (y2) has, at least at one location of the bent part, an expanded part of dimensions of a direction toward the inner side of the bend in a cross-section vertical to a pipe axis and a direction vertical to that direction of at least 1.35× of a circle equivalent diameter of an end of the metal pipe, and (z2) has an outer side of the bent part of substantially the same radius of curvature.

(4) A hydroformed product as set forth in (3), characterized in that in the shape of the outer side of the bent part, a (maximum value of radius of curvature−minimum value of radius of curvature)/minimum value of radius of curvature is 50% or less.

According to the present invention, it is possible to expand the range of parts to which hydroforming can be applied compared with the past. Due to this, automobiles can be made further lighter in weight, the fuel economy can be improved, and suppression of global warming can be contributed to as well.

BRIEF DESCRIPTION OF THE DRAWINGS

FIG. 10 are views showing the state of hydroforming (working at first hydroforming step). (a) shows a state where a metal pipe is gripped between a top mold and a bottom mold, while (b) shows the state where axial pushing punches are pushed in at the two pipe ends in the arrow directions.

BEST MODE FOR CARRYING OUT THE INVENTION

The present invention will be explained based on the drawings.

Figure 1:
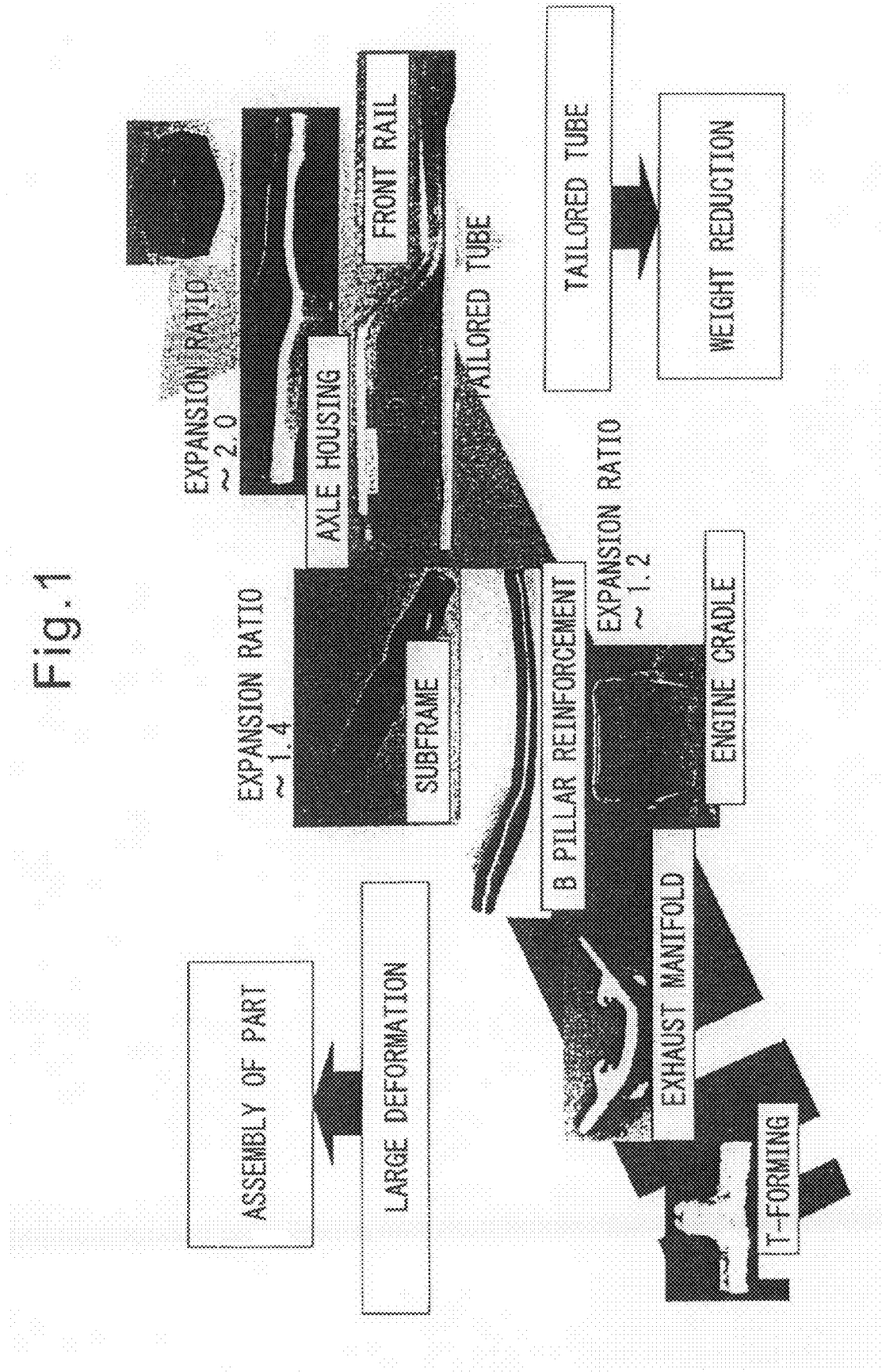
FIG. 1 is a view showing the advances made in hydroforming technology.
Figure 2:
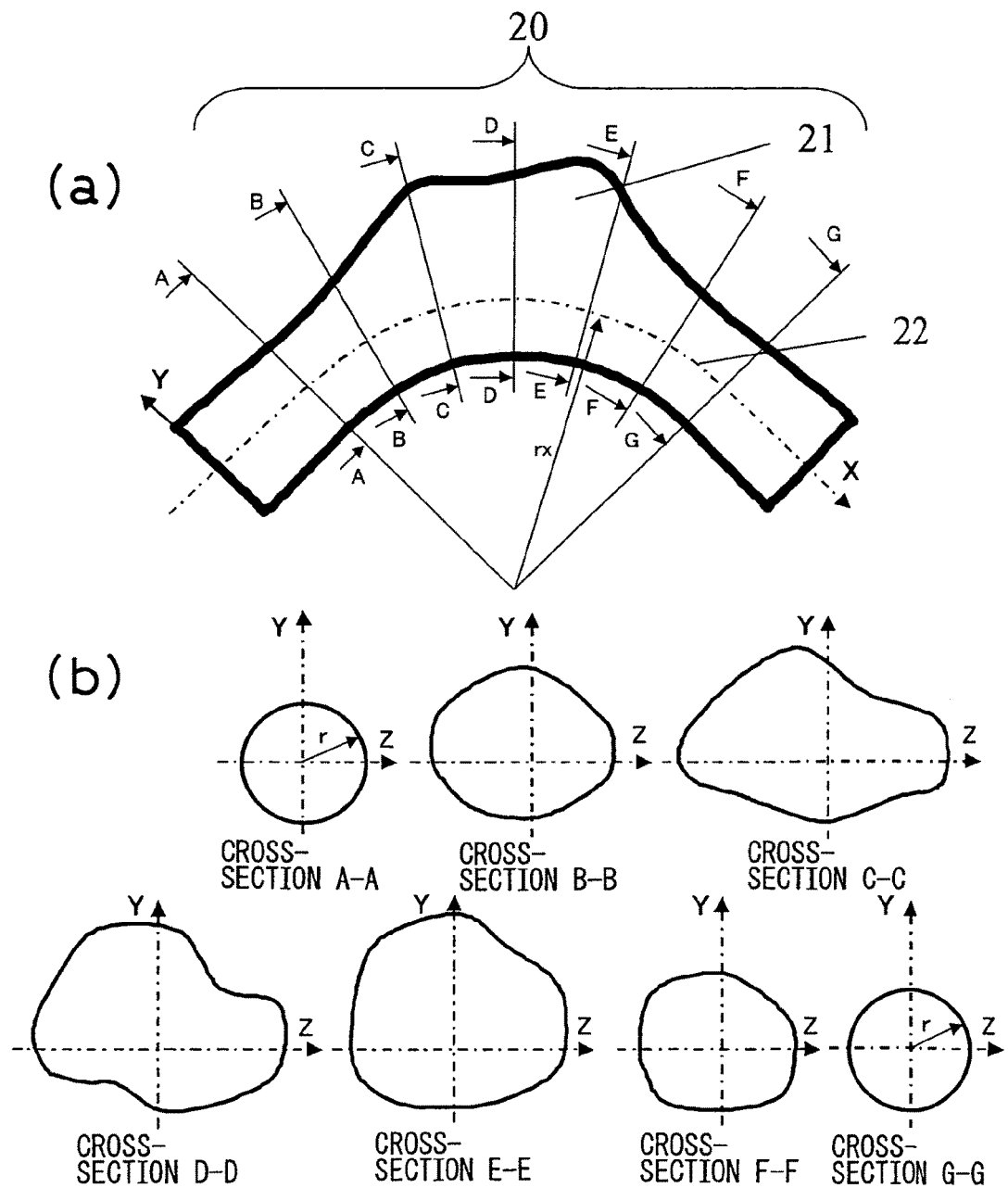
FIG. 2 are views showing one shape of a hydroformed product of the present invention (the worked product of the present invention). (a) shows the side shape, while (b) shows the cross-sectional shapes.

FIG. 2 show one shape of a hydroformed product of the present invention (sometimes referred to as "the worked product of the present invention"). FIG. 2(a) shows the side shape of the worked product of the present invention with an expanded part 21 sticking out to the outside from the pipe axis of the bent part 20.

Note that in the present invention, the "bent part" is a part where the direction (X-axis) of the pipe axis 22 is not straight. As shown in FIG. 2(a), it means the part with the circular cross-section between the cross-section A-A and cross-section G-G (see FIG. 2(b)).

FIG. 2(b) shows the cross-sectional shapes at a cross-section A-A, cross-section B-B, cross-section C-C, cross-section D-D, cross-section E-E, cross-section F-F, and cross-section G-G (see FIG. 2(a)) vertical to the X-axis, where the X-axis is the pipe axial direction in the plane of the bent part 20.

As shown in FIG. 2(b), the worked product of the present invention shown in FIG. 2(a) is greatly expanded at the bent part 20 in the Y-direction (in FIG. 2(a), a direction in the paper surface) and the Z-direction (in FIG. 2(a), a direction vertical to the paper surface).

However, in the Y-direction, the pipe is expanded in only the + direction, that is, the direction toward the outer side of the bent part 20 (sometimes referred to as the "outer side of the bend").

Figure 3:
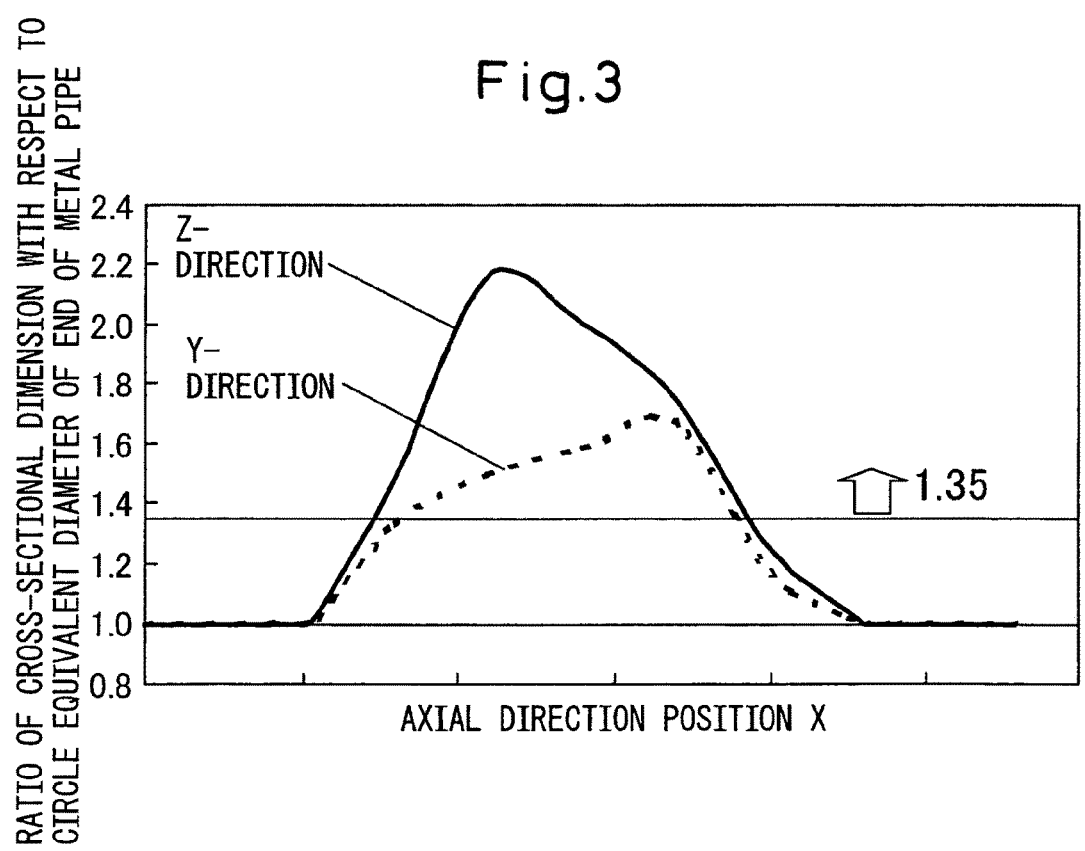
FIG. 3 is a view showing the ratio of cross-sectional dimensions in the Y-direction and Z-direction with respect to the circle equivalent diameter of an end of the metal pipe.

Here, FIG. 3 shows the ratio of the cross-sectional dimensions in the Y-direction and Z-direction with respect to the circle equivalent diameter of an end of the metal pipe (in the case of the shape shown in FIG. 2, the diameter since the end is left as in the stock pipe (circular)). From the figure, it is learned that in the cross-sections of at least one location in the Y-direction and Z-direction, the pipe is expanded to at least 1.35× the circle equivalent diameter of an end of the stock pipe (see FIG. 2(a), "21") (see invention of above (1)).

The ends of an expanded metal pipe are usually in the state of the stock pipe, so are circular, but sometimes the ends are deformed flat for use, so in the present invention, the circle equivalent diameter of an end of the expanded metal pipe is used as a reference.

Furthermore, in the present invention, it is defined that "at least at one location of the bent part, having an expanded part with dimensions of the direction toward the outer side or inner side of the bend in the cross-section vertical to the pipe axis and the direction vertical to that direction of at least 1.35× the circle equivalent diameter of an end of the metal pipe" (requirements (y1) and (y2)).

To arrange a metal pipe having a bent part in a restricted space, it is necessary to expand the pipe by the required dimensional ratio or more to form a bent part.

The inventors confirmed experimentally that if the above dimensional ratio is less than 1.35, the bending of the metal pipe is small and placement in a restricted space becomes difficult and therefore defined the cross-sectional dimensions of the expanded part as "at least 1.35× of the circle equivalent diameter of an end of the metal pipe.

The worked product of the present invention shown in FIGS. 2(a) and (b) has an expanded part 21 sticking out to the outer side from the pipe axis 22 of the bent part 20 (outer side of the bend), but the inner side of the bent part 20 (inner side of the bend) maintains an arc shape of substantially the same radius of curvature.

In the worked product of the present invention, this point is also a characterizing feature (see invention of above (1)).

The inner side of the bent part may be shaped as an arc shape with substantially the same radius of curvature or also an elliptical shape, a curved shape of a multidimensional function, or a shape of a combination of a plurality of radii of curvature.

In the shape of the inner side of the bent part, if the (maximum value of radius of curvature−minimum value of radius of curvature)/minimum value of radius of curvature is 50% or less, it becomes possible to arrange the shaped product of the present invention in a restricted space of the bottom structure of an automobile etc.

Figure 4:
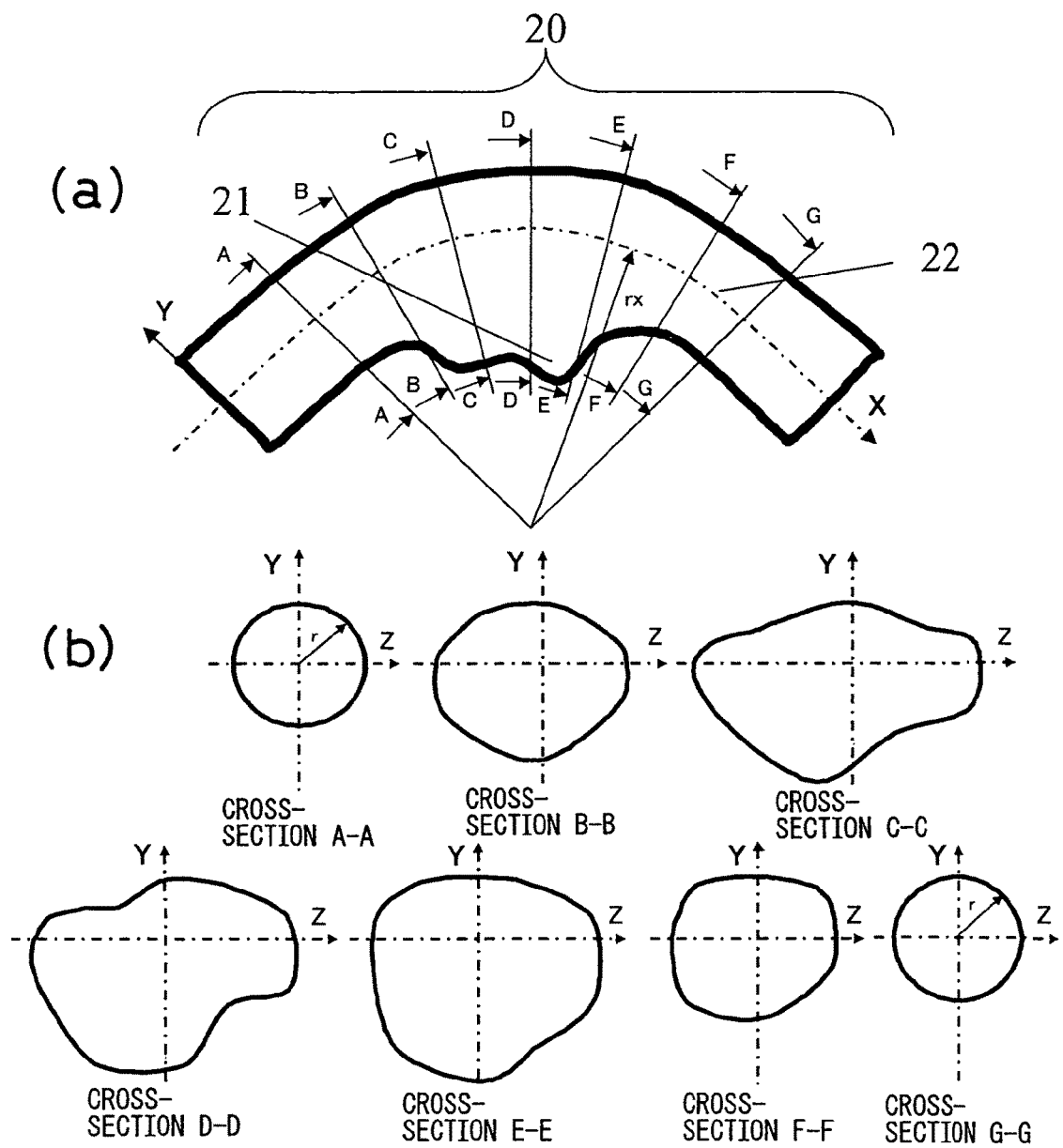
FIG. 4 are views showing another shape of the worked product of the present invention. (a) shows the side shape, while (b) shows the cross-sectional shapes.

Next, FIG. 4 show an example of the worked product of the present invention with an expanded part sticking out to the inner side from the pipe axis of the bent part and with the outer side of the bent part maintaining a shape of substantially the same radius of curvature (see invention of above (2)).

FIG. 4(a) shows the side shape of the worked product of the present invention with an expanded part 21 bent sticking out to the inner side from the pipe axis of the bent part 20.

FIG. 4(b) shows the cross-sectional shapes in the cross-section A-A, cross-section B-B, cross-section C-C, cross-section D-D, cross-section E-E, cross-section F-F, and cross-section G-G (see FIG. 4(a)) vertical to the X-axis, where the X-axis is the pipe axial direction in the plane of the bent part 20.

As shown in FIG. 4(b), the worked product of the present invention shown in FIG. 4(a) is greatly expanded at the bent part 20 in the Y-direction (in FIG. 4(a), a direction in the paper surface) and in the Z-direction (in FIG. 4(a), a direction vertical to the paper surface).

However, in the Y-direction, the pipe is expanded in only the − direction, that is, the direction toward the inner side of the bent part 20 (below, sometimes referred to as the "inner side of the bend").

Figure 5:
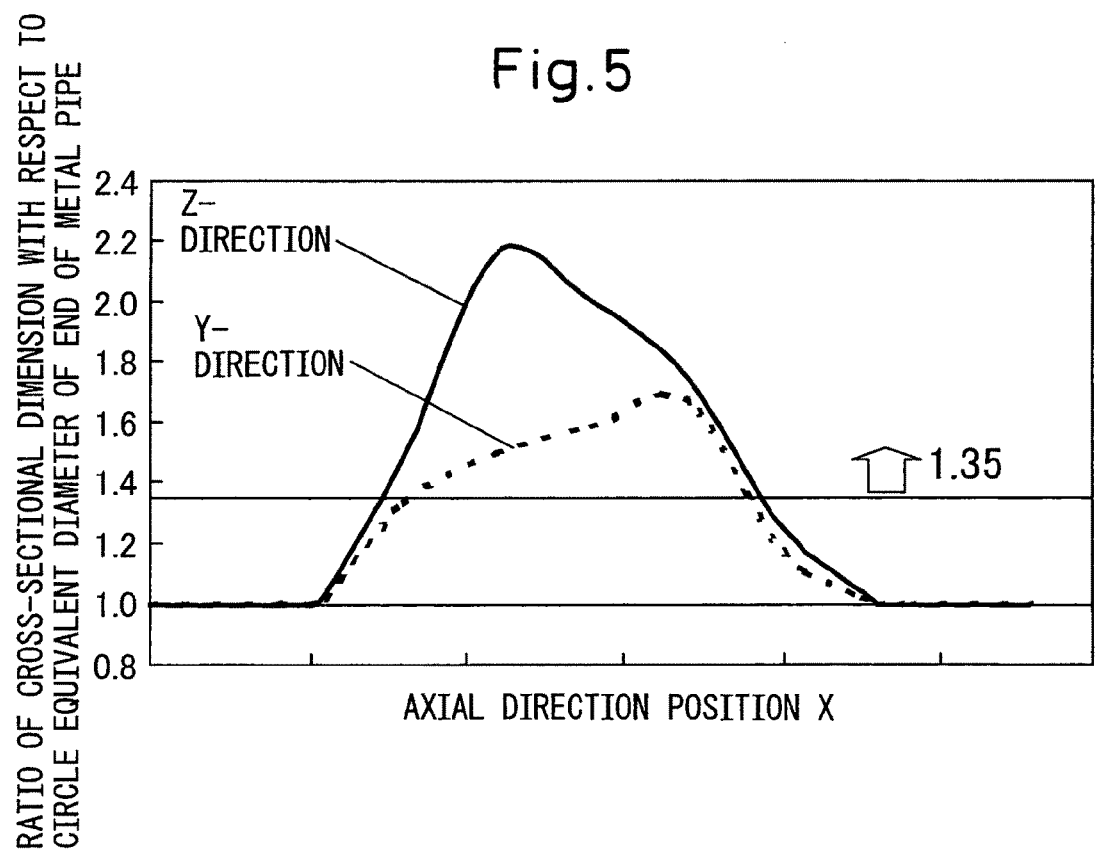
FIG. 5 is a view showing the ratio of cross-sectional dimensions in the Y-direction and Z-direction with respect to the circle equivalent diameter of an end of the metal pipe.
Figure 6:
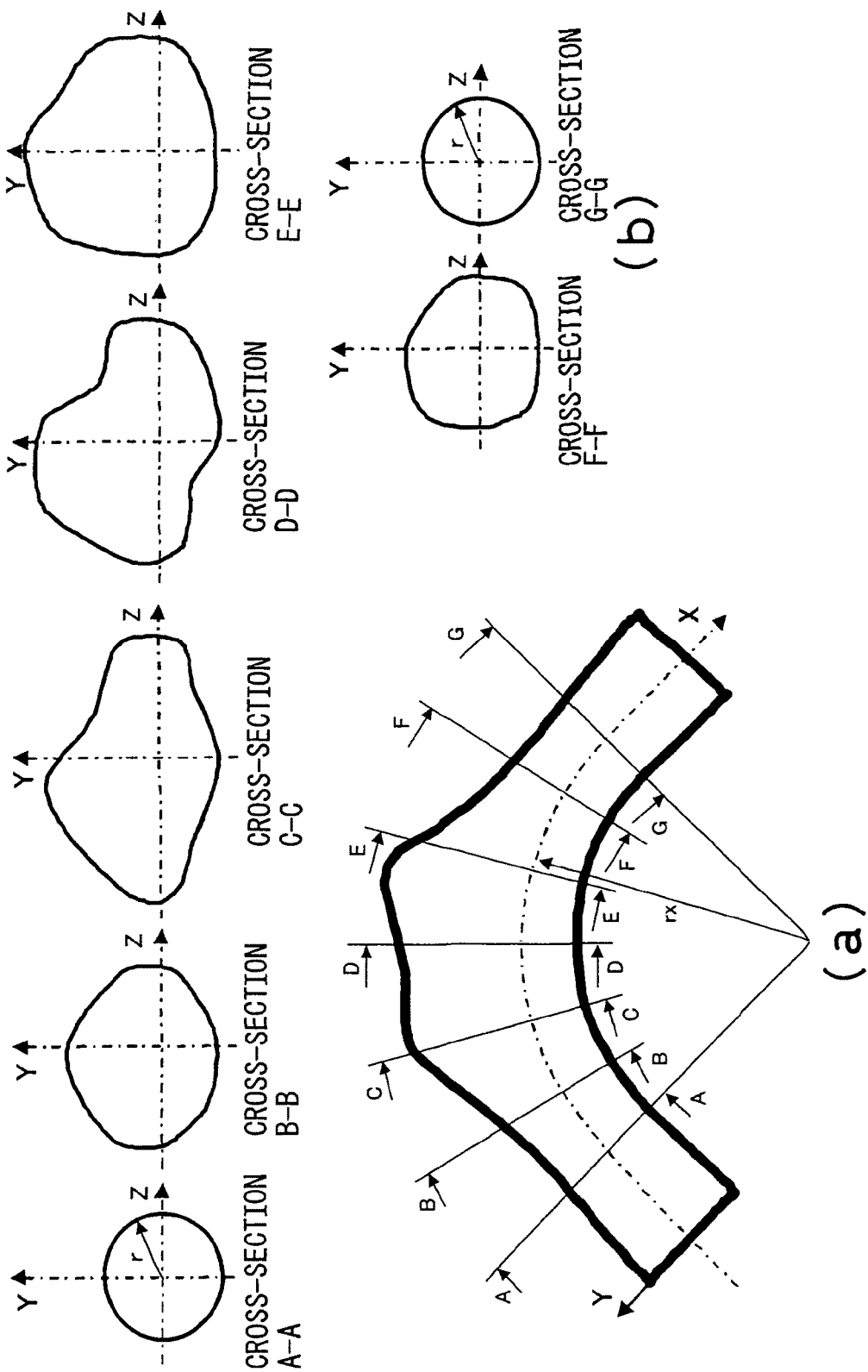
FIG. 6 are views explaining the design of the shape of an intermediate product. (a) shows the side cross-sectional (X-Y plane) shape of the shape of the final product, while (b) shows the cross-sectional (Y-Z plane) shapes at cross-sections vertical to the pipe axis X of the final product.

Here, FIG. 5 shows the ratio of the cross-sectional dimensions in the different directions with respect to the circle equivalent diameter of an end of the metal stock pipe (in the case of the shape shown in FIG. 4, the diameter since the end is left as in the stock pipe (circular)).

From the figure, it is understood that at least at one location of the cross-sections in both the Y-direction and Z-direction, there is an expanded part expanded to 1.35× or more of the circle equivalent diameter of an end of the stock pipe (see FIG. 4(a), "21") (see invention of above (2)).

Note that the technical reason for defining the above cross-sectional dimensional ratio as "1.35× or more of the circle equivalent diameter of an end of the stock pipe" is as explained above.

The worked product of the present invention shown in FIG. 4(a), in contrast to the worked product of the present invention shown in FIG. 2(a), has an expanded part 21 sticking out to the inside from the pipe axis 22 of the bent part 20 (inside of the bend), but the outer side of the bent part 20 maintains an arc shape of substantially the same radius of curvature.

In the worked product of the present invention, this point is also a characterizing feature (see invention of above (3)).

The outer side of the bent part may be shaped as an arc shape with substantially the same radius of curvature or also an elliptical shape, a curved shape of a multidimensional function, or a shape of a combination of a plurality of radii of curvature.

In the shape at the outer side of the bent part, if the (maximum value of radius of curvature−minimum value of radius of curvature)/minimum value of radius of curvature is 50% or less, the shaped product of the present invention can be arranged in the restricted space of the bottom structure of an automobile etc.

Next, the method of working for obtaining the worked product of the present invention of the shape shown in FIG. 2 or FIG. 4 will be explained.

The working method is basically comprised of the three steps of a first hydroforming step, a bending step, and a second hydroforming step.

Based on FIG. 6 to FIG. 9, the procedure for design of the shape of the intermediate product after the first hydroforming step will be explained.

FIG. 6(a) shows the side cross-sectional (X-Y plane) shape of the shape of the final product, while FIG. 6(b) shows the cross-sectional (Y-Z plane) shapes in cross-sections vertical to the pipe axis X (cross-section A-A, cross-section B-B, cross-section C-C, cross-section D-D, cross-section E-E, cross-section F-F, and cross-section G-G).

Figure 7:
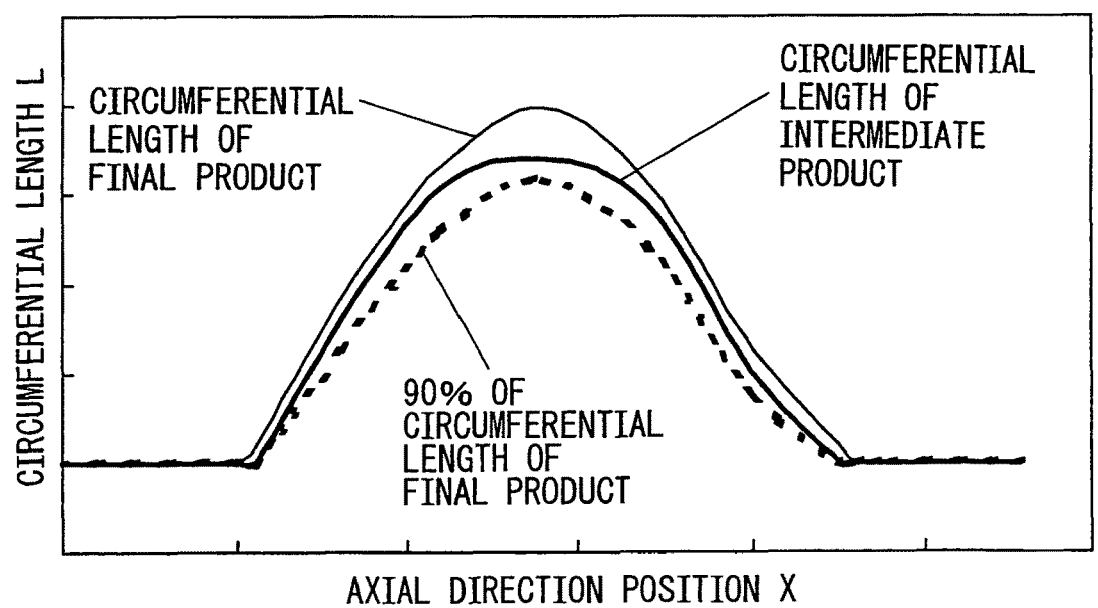
FIG. 7 is a view showing the circumferential length of the shape of the final product and the circumferential length of the shape of the intermediate product in the design of the shape of an intermediate product.

FIG. 7 shows the circumferential length of the shape of the final product and the circumferential length of the shape of the intermediate product. This point will be explained later.

Figure 8:
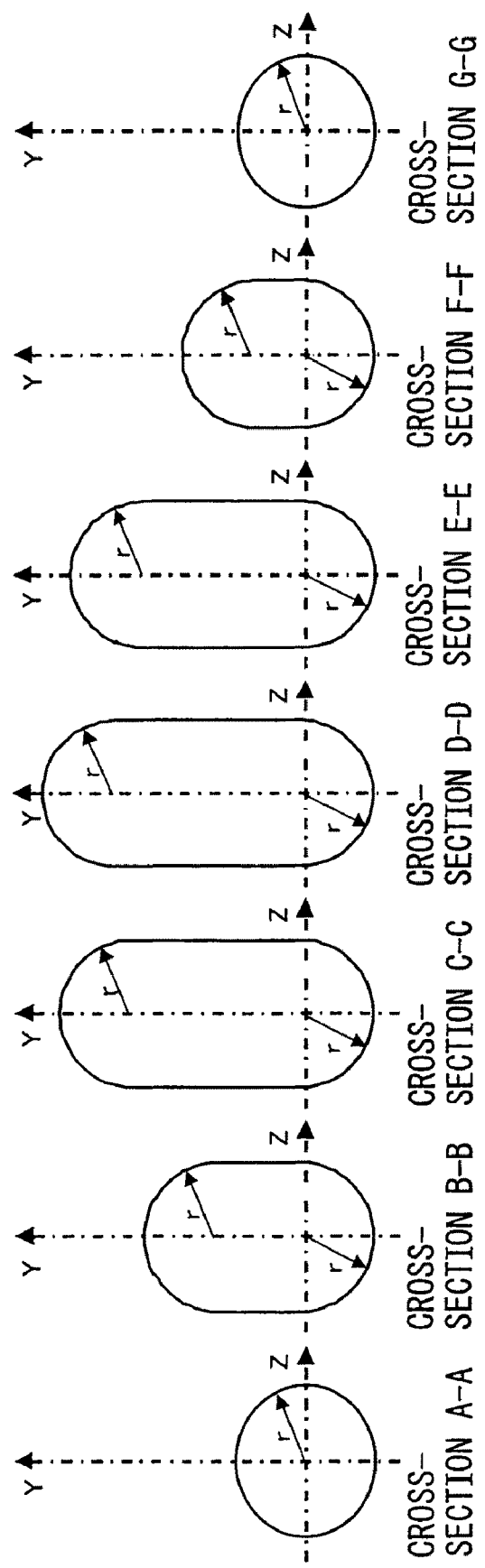
FIG. 8 is a view showing the cross-sectional (Y-Z plane) shapes of an intermediate product expanded in only one direction in the design of the shape of the intermediate product.

FIG. 8 shows the cross-sectional (Y-Z plane) shapes of the intermediate product expanded in only one direction in the first hydroforming step along the cross-section A-A, cross-section B-B, cross-section C-C, cross-section D-D, cross-section E-E, cross-section F-F, and cross-section G-G.

FIG. 9(a) shows the shapes of the side surface (X-Y plane) of the above intermediate product along the cross-section A-A, cross-section B-B, cross-section C-C, cross-section D-D, cross-section E-E, cross-section F-F, and cross-section G-G, while FIG. 9(b) shows the shapes of the top surface of the above intermediate product (X-Z plane) along the above cross-sections.

In the first hydroforming step, the pipe is expanded in only one direction. In the intermediate product shown in FIG. 8 and FIG. 9, the pipe is expanded in only the Y-direction.

If expanding the pipe in only one direction, the deformation becomes deformation close to simple shear deformation and major deformation becomes possible, so in the present invention, the pipe is expanded in only one direction.

In the conventional method described in Patent Document (Japanese Patent Publication (A) No. 2002-100318) as well, an approach enabling large deformation is adopted, but in the second hydroforming step of the conventional method, causing simple shear deformation is difficult in practice.

That is, in the conventional method, unless a counter punch or other measure is devised, bulging will occur at the initial working and cracks will easily form.

As opposed to this, in the present invention, to lower the difficult of shaping in the second hydroforming step, in the first hydroforming step, the pipe is expanded to substantially about the same extent as the circumferential length of the shape of the final product, for example, 90% or more of that circumferential length. This point is a different point from the conventional method.

However, in the first hydroforming step, if exceeding 100% of the circumferential length of the shape of the final product in the shaping process, there will be parts where the material becomes excessive and wrinkles will be formed in some cases, so in the first hydroforming step, as shown in FIG. 7, the circumferential length of the shape of the intermediate product is set to a range of 90 to 100% of the circumferential length of the shape of the final product.

Figure 9:
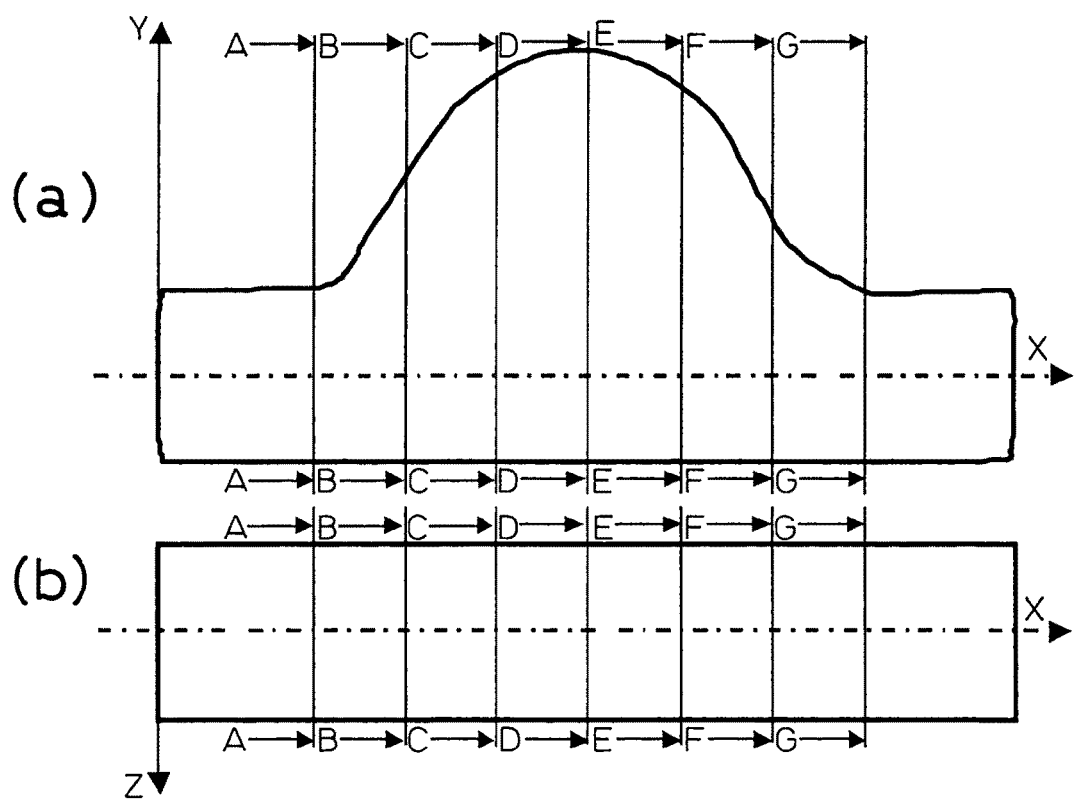
FIG. 9 are views showing the shape of an intermediate product expanded in only one direction in the design of the shape of the intermediate product. (a) shows the side surface (X-Y plane) shape, while (b) shows the top surface (X-Z plane) shape.

It is possible to design the shape of the intermediate product shown in FIG. 8 and FIG. 9 based on this thinking.

That is, in the shape of the intermediate product shown in FIG. 8 and FIG. 9, the pipe is not expanded in the Z-direction of the cross-section, but is expanded only to the + side in the Y-direction. Its circumferential length is set to a range of 90 to 100% of the circumferential length of the final product in the entire cross-section.

The shape of the final product is a shape expanded in the Y-direction and Z-direction, so the height of the shape of the intermediate product in the Y-direction is greater than the height of the shape of the final product in the Y-direction.

Further, the shape of the bottom part and top part of the final product may be a flat shape, that is, rectangular, but in this case the thickness is easily reduced near the corner parts, so this becomes disadvantageous in the case of a large pipe expansion rate.

Therefore, as shown in FIG. 8, the shape of the bottom part and top part of the final product is preferably set to a shape with a radius of curvature substantially the same as the stock pipe (radius of curvature same as radius of curvature r of product).

Specifically, by the hydroforming shown in FIG. 10 (working at first hydroforming step), an intermediate product 7 of the shape shown in FIG. 8 and FIG. 9 is produced.

That is, as shown in FIG. 10(a), a metal pipe 1 is gripped between a top mold 2 and bottom mold 3 and, as shown in FIG. 10(b), is pushed in from the two pipe ends by axial pushing punches 4 in the arrow direction (pipe axial direction).

At this time, simultaneously, water 6 is fed inside the metal pipe 1 from water feed ports 5 provided in the axial pushing punches 4 to raise the internal pressure. As a result, the metal pipe 1 is worked to the shape of the cavity formed by the top mold 2 and bottom mold 3 whereby an intermediate product 7 is obtained.

Figure 11:
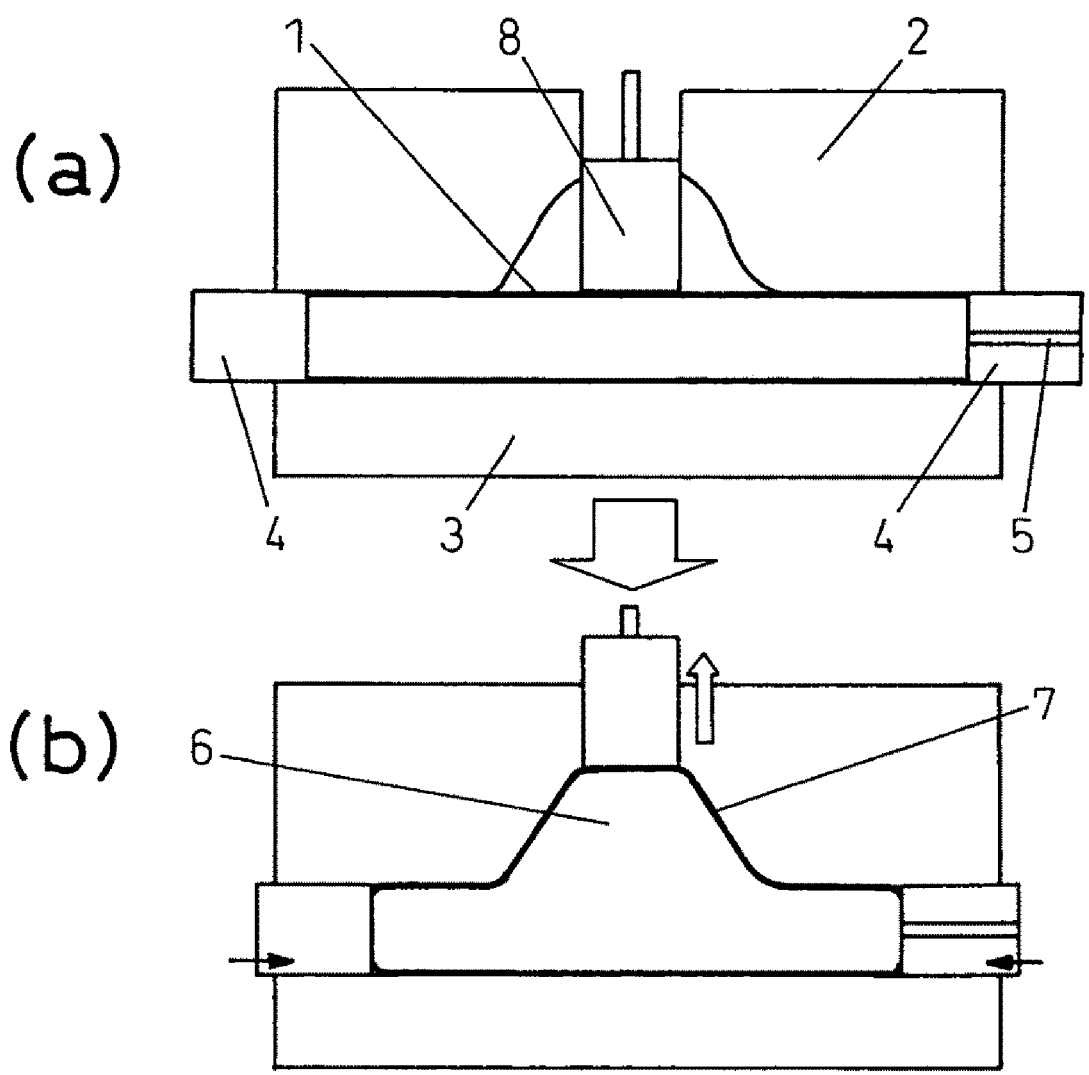
FIG. 11 are views showing the state of other hydroforming (working at first hydroforming step). (a) shows a state where a metal pipe is gripped between a top mold and counter punch provided at the top mold and a bottom mold, while (b) shows the state where axial pushing punches are pushed in at the two pipe ends in the arrow directions and the counter punch is retracted.

When the pipe expansion rate at the first hydroforming step is large, as shown in FIG. 11, the top mold 2 is provided with a counter punch 8 (see FIG. 11(a)). It is also possible to retract the counter punch 8 for hydroforming while suppressing bursting or buckling of the metal pipe 1 (see FIG. 11(b)).

Figure 12:
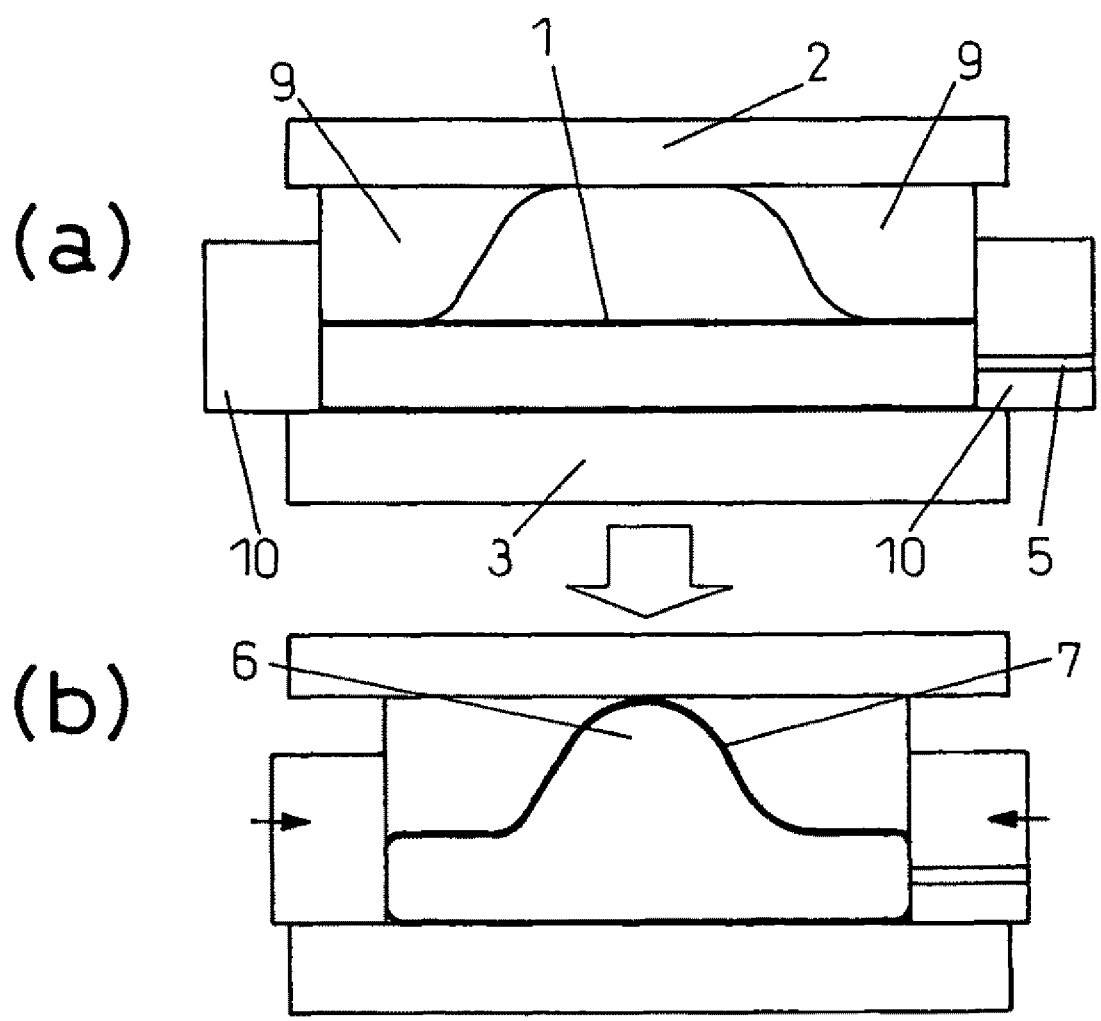
FIG. 12 are views showing the state of still another hydroforming (working at first hydroforming step). (a) shows a state where a metal pipe is gripped between a top mold and a bottom mold, while (b) shows the state where the pipe ends and movable mold are pushed in by the axial pushing punches in the arrow directions.

When the sliding resistance of the straight pipe part is large and it is difficult to convey the pushing action to the expanded part, as shown in FIG. 12, it is also possible to use a movable mold 9 (see FIG. 12(a)) and simultaneously push in the pipe ends and the movable mold by the axial pushing punches 10 (see FIG. 12(b)) for hydroforming.

Figure 13:
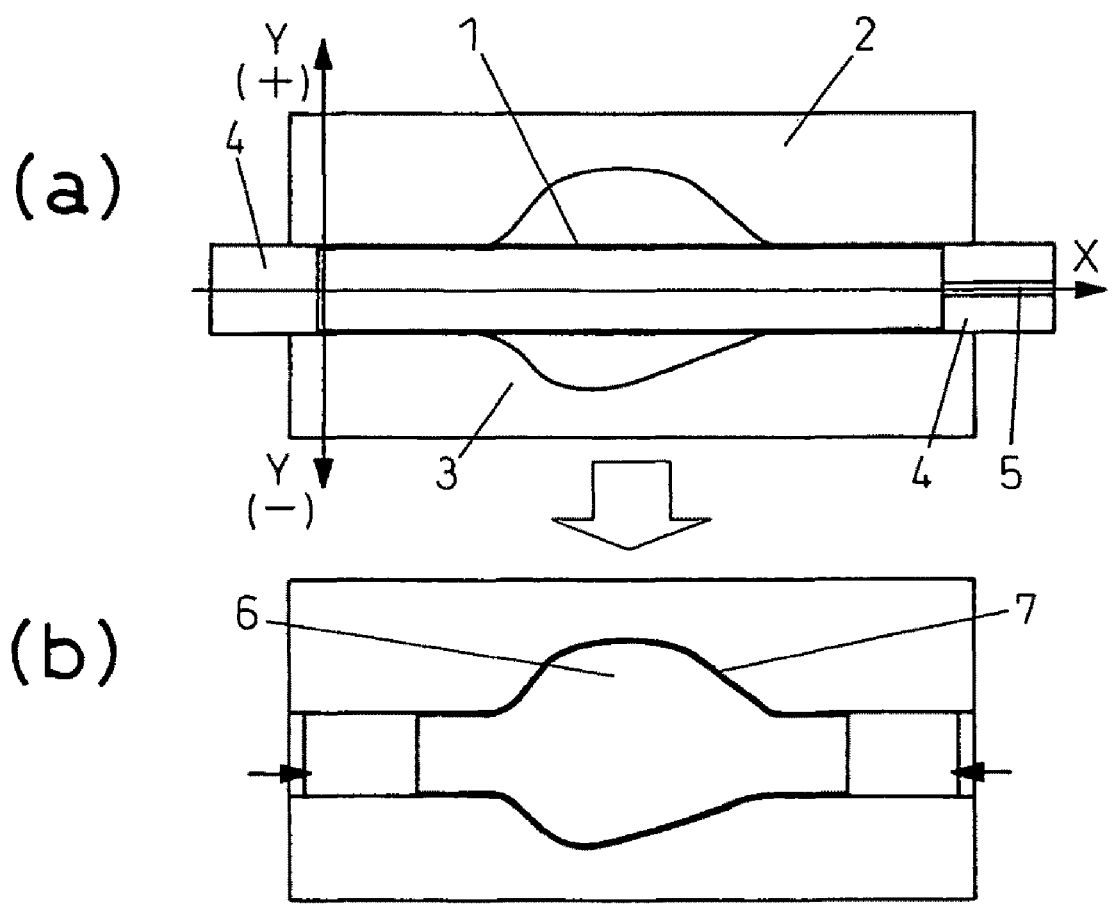
FIG. 13 are views showing the state of still another hydroforming (working at first hydroforming step). (a) shows a state where a metal pipe is gripped between a top mold and a bottom mold, while (b) shows the state where axial pushing punches are pushed in at the two pipe ends in the arrow directions.
Figure 14:
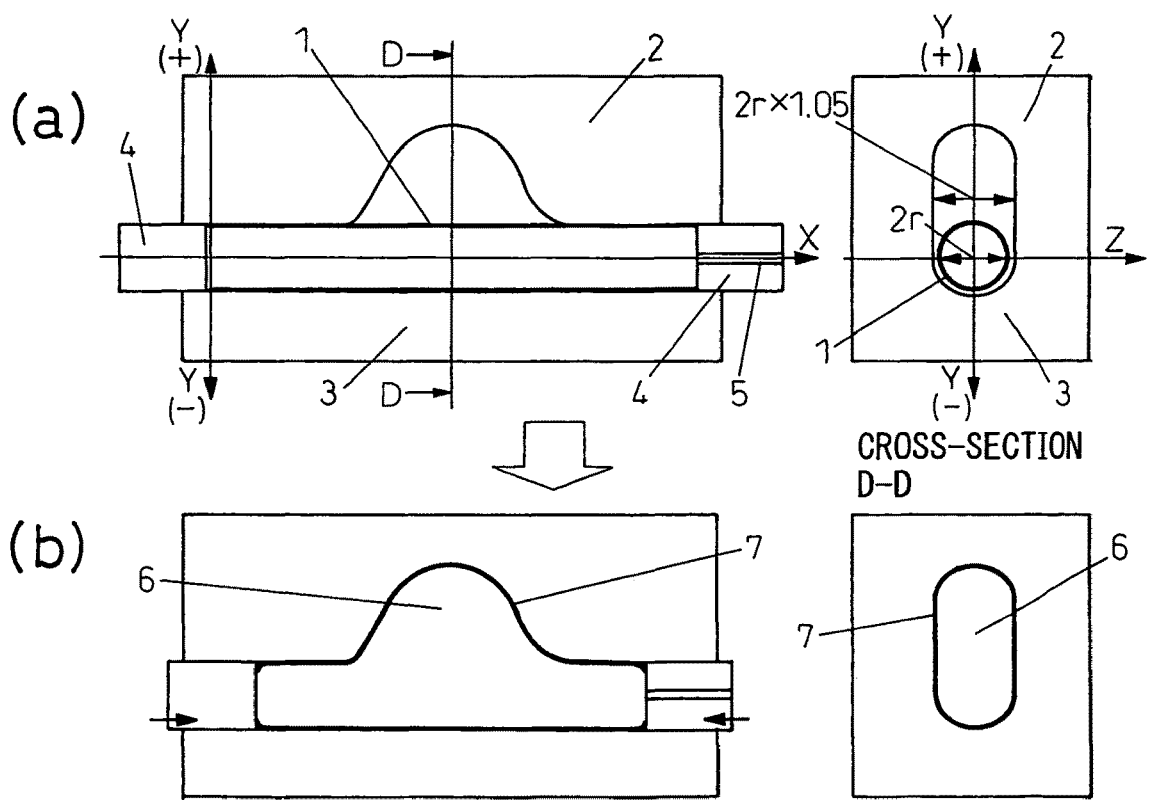
FIG. 14 are views showing the state of still other hydroforming (working at first hydroforming step). (a) shows a state where a metal pipe is gripped between a top mold and a bottom mold, while (b) shows the state where axial pushing punches are pushed in at the two pipe ends in the arrow directions.

In hydroforming, expansion in the Z-direction is not prohibited, so as shown in FIG. 13(a) and (b) and FIG. 14(a) and (b), the pipe may also be expanded in the Y-direction while expanding it somewhat in the Z-direction.

FIG. 14(a) and (b) show the case of expanding a pipe in the Z-direction to about 1.05× the stock pipe diameter 2r.

By expanding the intermediate product 7 somewhat in the Z-direction as well, it is possible to obtain a final product of the worked product of the present invention with a larger pipe expansion rate.

Figure 15:
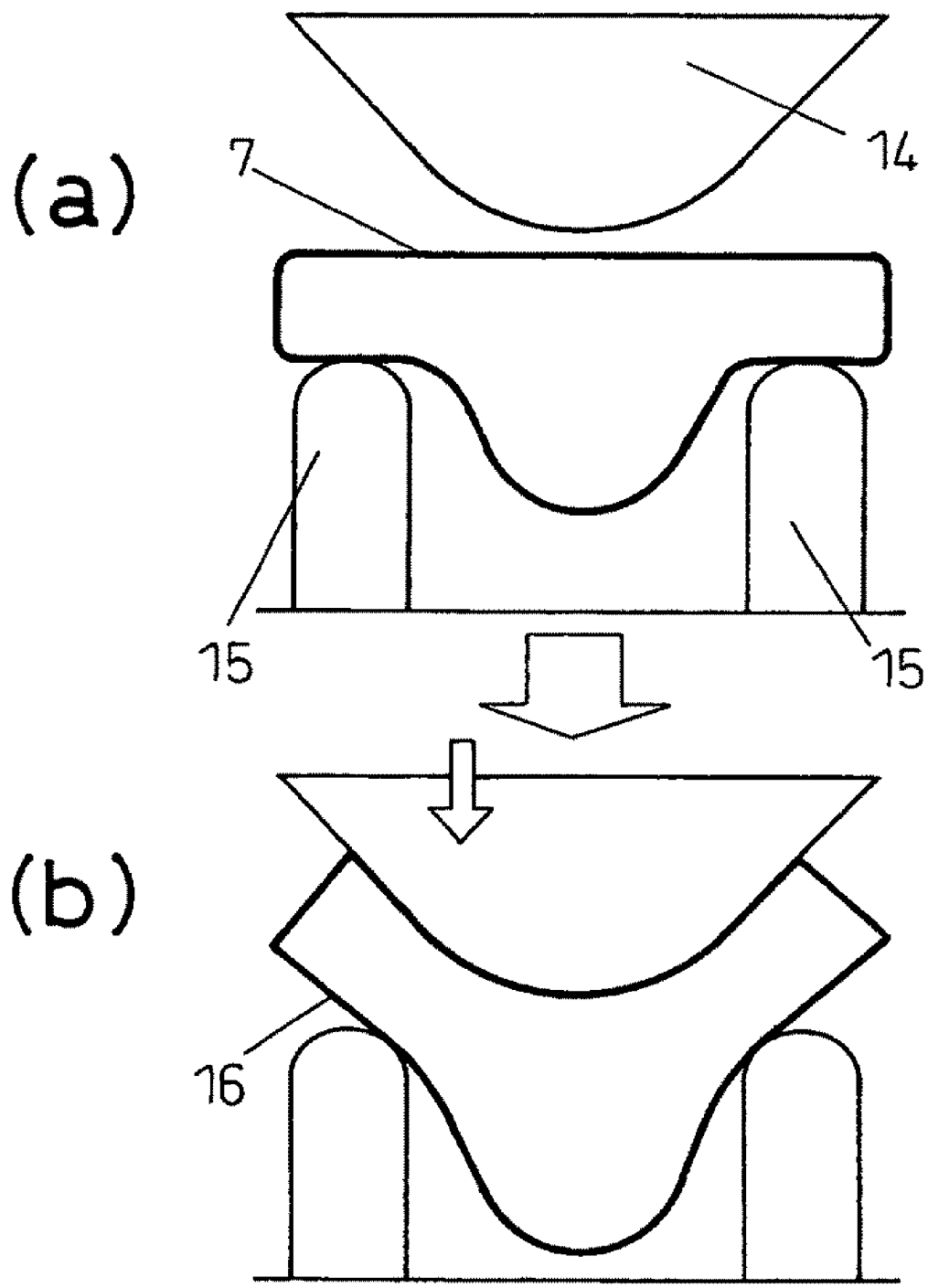
FIG. 15 are views showing the state of bending an intermediate product obtained by working in the first hydroforming step by three-point bending. (a) shows the state of supporting the intermediate product by fulcrums, while (b) shows a state of pushing a punch into the intermediate product to bend it.

The intermediate product 7 worked in the first hydroforming step is, for example, as shown in FIG. 15(a) and (b), bent by pressing (comparatively simple three-point bending method).

That is, the intermediate product 7 worked by the first hydroforming step is placed on fulcrums 15 (see FIG. 15(a)), then a punch 14 is pushed down from above (see arrow in FIG. 15(b)) to obtain an intermediate product 16.

Note that as the method of bending, in addition to the three-point bending method, the rotary draw bending method, the press bending method, or any other method may be used. These may be selectively used according to the size or grade of the pipe material, the bending radius, etc.

Figure 16:
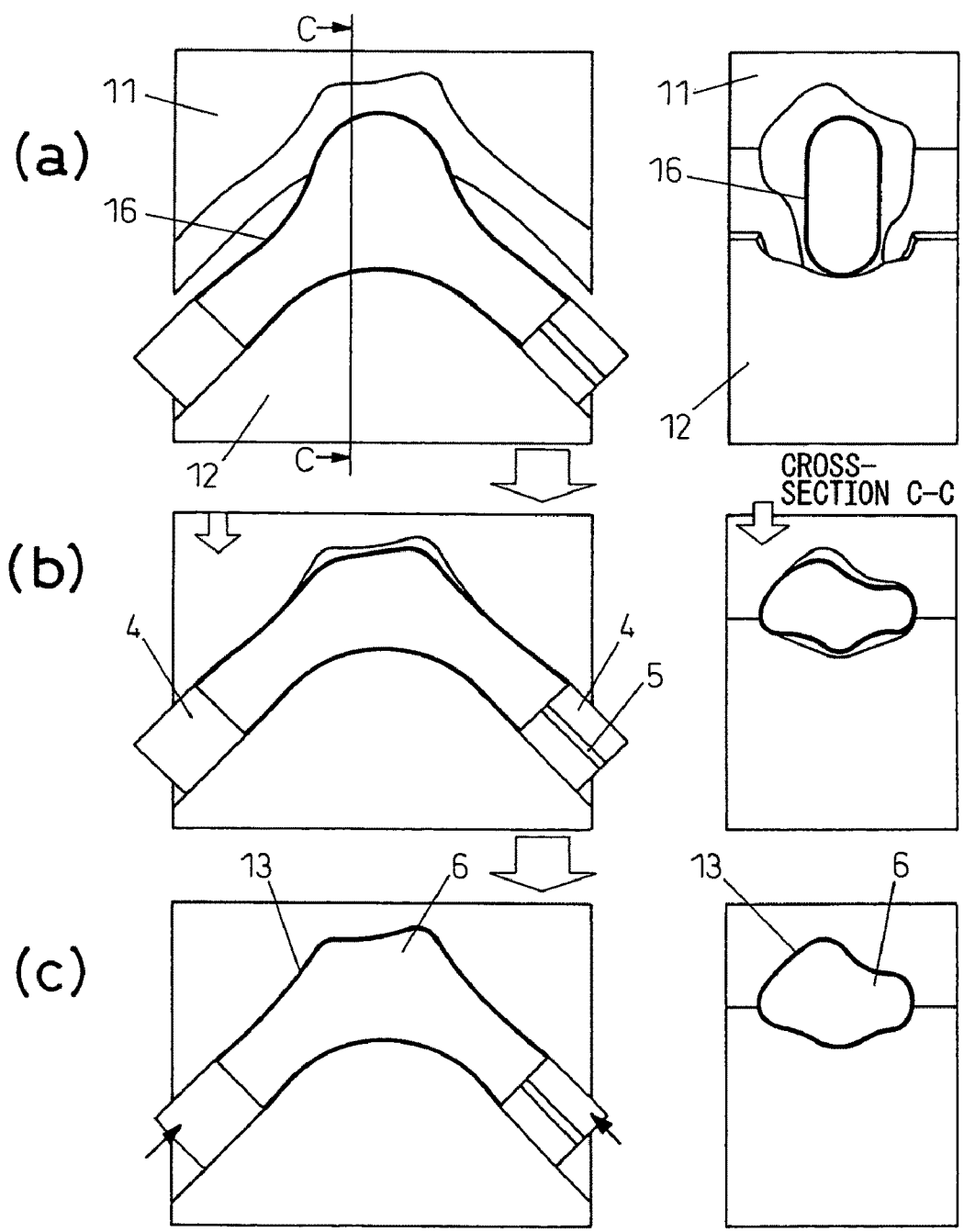
FIG. 16 are views showing the state of hydroforming (working in second hydroforming step) an intermediate product having a bent part. (a) shows the state where the intermediate product is loaded into the bottom mold, (b) shows the state of crushing it in the Y-direction while clamping the mold, and (c) shows the state of applying internal pressure and/or pushing in the axial direction to obtain the final product.

The radius of curvature of the punch 14 is not particularly limited, but in the same way as the radius of curvature of the hydroforming mold (bottom side) explained in the later mentioned FIG. 16, if making it the range of (maximum value of radius of curvature−minimum value of radius of curvature)/minimum value of radius of curvature ≦50%, it is possible to obtain the worked product of the present invention with an expanded part sticking out to the outside from the pipe axis of the bent part and with the inner side of the bent part having substantially the same radius of curvature.

Finally, the bent intermediate product 16 is, as shown in FIGS. 16(a) to (c), worked by the second hydroforming step. That is, the intermediate product 16 is loaded into the bottom mold 12 (see FIG. 16(a)), then is crushed in the Y-direction by the top mold 11 during mold clamping (see arrow in FIG. 16(b)).

By this mold clamping, the intermediate product 16 is increased in cross-section in the Z-direction by the amount of it being crushed in the Y-direction. At this time, if clamping the mold while applying internal pressure inside the intermediate product 16, the occurrence of wrinkles can be suppressed.

After the mold clamping, the usual hydroforming is performed to increase the internal pressure and/or push in the pipe in the axial direction to obtain a final product 13 matching the mold shape (see FIG. 16(c)).

If making the radius of curvature of the hydroforming mold (bottom side) a range of the (maximum value of radius of curvature−minimum value of radius of curvature)/minimum value of radius of curvature ≦50%, it is possible to obtain a shaped product of the invention of the above (1) with an expanded part sticking out to the outside from the pipe axis of the bent part and with the inner side of the bent part having substantially the same radius of curvature.

In this way, it is possible to obtain a worked product of the present invention with an expanded part sticking out to the outside in the pipe axial direction of the bent part.

In the worked product of the present invention, the expanded part need not stick out to the outer side of the bend and may also stick out to the inner side of the bend. When making the expanded part stick out, as shown in FIG. 17, the fulcrums 15 are used to support the intermediate product 7 and a punch 14 provided with a recessed part 23 is used to push in the pipe to bend it.

At this time, the expanded part is kept from being crushed by the punch 14 and fulcrums 15. However, if in a range not a hindrance in the later second hydroforming step, the expanded part may be deformed somewhat.

Figure 17:
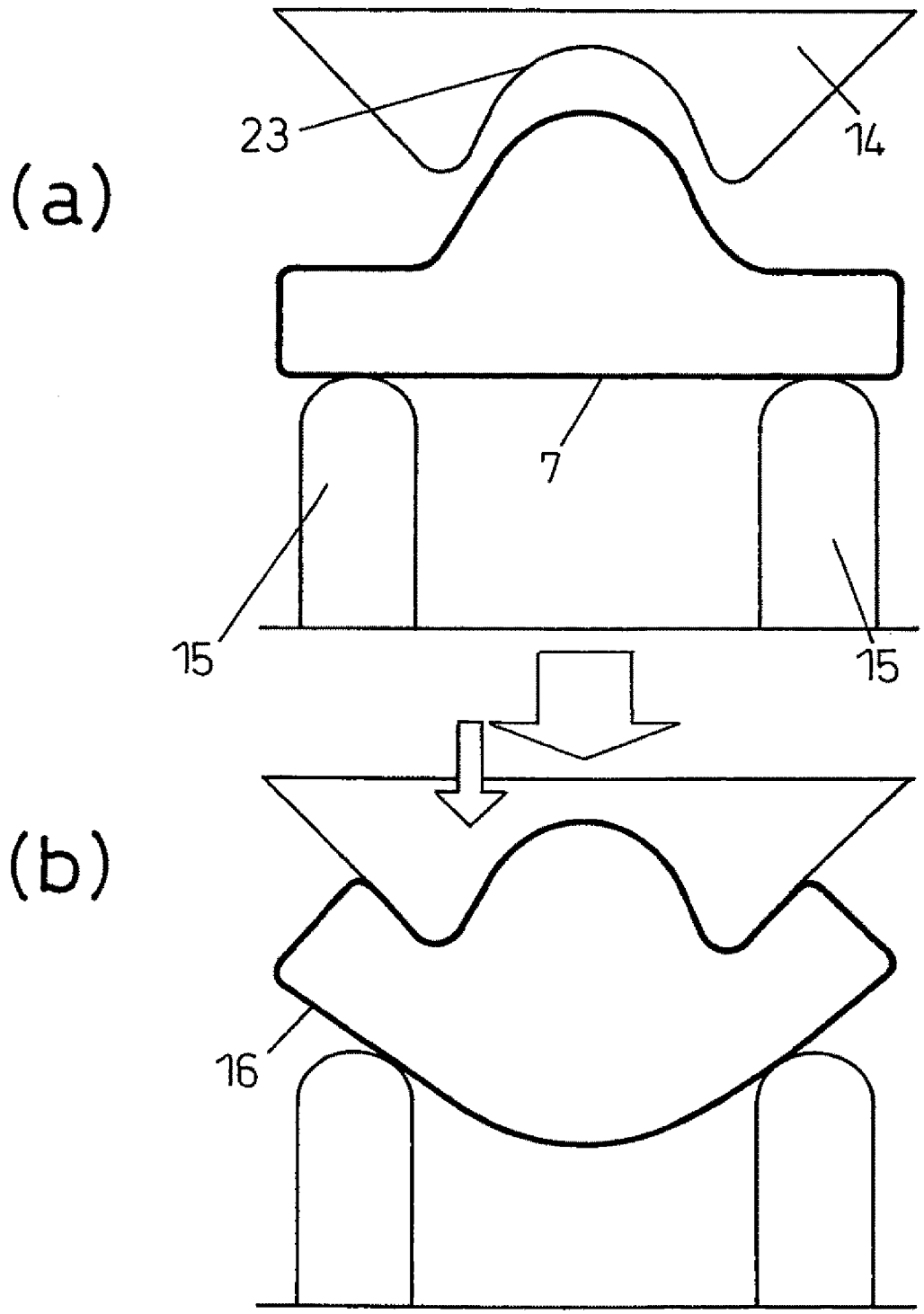
FIG. 17 are views showing the state of bending when an expanded part sticks out to the inner side with respect to the pipe axis of a bent part. (a) shows the state of an intermediate product supported by fulcrums, while (b) shows the state of pushing against the intermediate product by a punch provided with a recessed part for bending it.

In the second hydroforming step (step corresponding to FIG. 16, not shown) after the bending shown in FIG. 17, if making the radius of curvature of the hydroforming mold at the outer side of the bend a range of the (maximum value of radius of curvature−minimum value of radius of curvature)/minimum value of radius of curvature ≦50%, it is possible to obtain a shaped product of the present invention in the invention of the above (3) with an expanded part sticking out to the inner side from the pipe axis of the bent part and with the outer side of the bent part having substantially the same radius of curvature.

EXAMPLES

Next, examples of the present invention will be explained, but the conditions in the examples are just examples of conditions for confirming the workability and effect of the present invention. The present invention is not limited to these examples of conditions.

The present invention can employ various conditions so long as not departing from the gist of the present invention and achieving the object of the present invention.

Example 1

As the metal pipe, steel pipe of an outside diameter of 63.5 mm, a thickness of 2.3 mm, and a total length of 400 mm was used. The steel type is STKM11A of carbon steel pipe for machine structural use.

Figure 18:
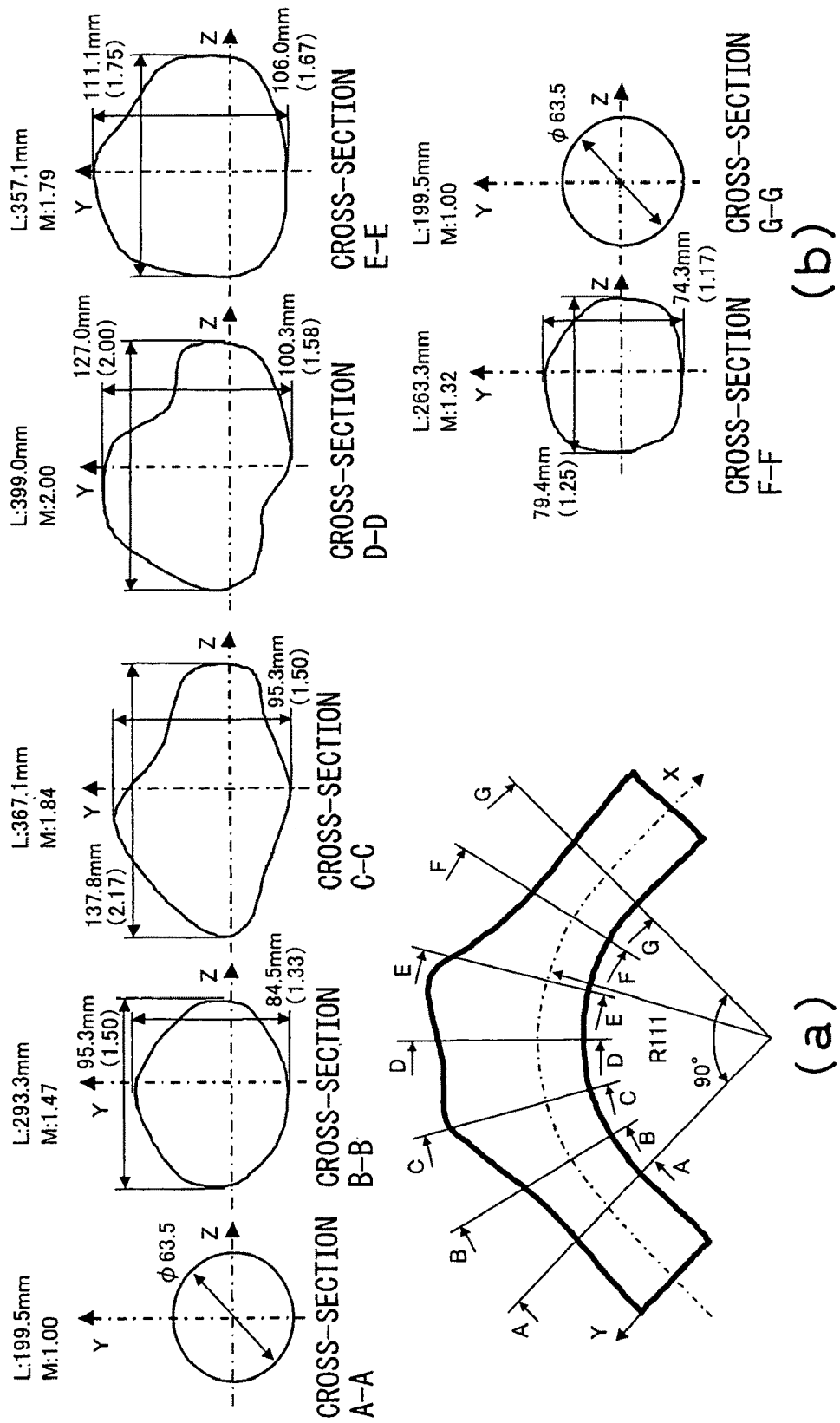
FIG. 18 are views showing the shape of the final product used for the design of the shape of the intermediate product. (a) shows the side cross-sectional (X-Y plane) shape of the final product, while (b) shows the cross-sectional (Y-Z plane) shapes in the pipe axis X-direction.

The shape of the final product is shown in FIG. 18. FIG. 18(a) shows the side cross-sectional (X-Y plane) shape of the final product, while FIG. 18(b) shows the cross-sectional (Y-Z plane) shapes of the pipe axis X-direction.

The above shape is a shape with the bent part expanded large with a pipe expansion rate M of a maximum of 2.00 and further with a Y-direction dimension of the cross-section of a maximum of 1.67× and a Z-direction dimension of a maximum of 2.17× with respect to the circle equivalent diameter (outside diameter) of 63.5 mm of an end of the metal pipe, that is, with the bent part greatly expanded.

Figure 19:
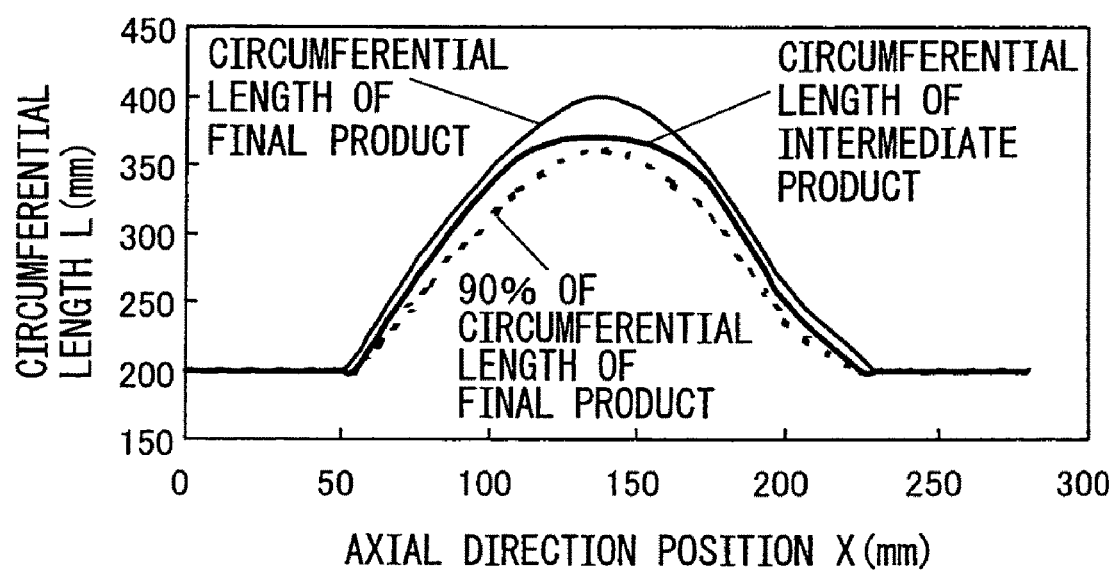
FIG. 19 shows the circumferential length of the shape of the final product and the circumferential length of the shape of the intermediate product in the design of the shape of an intermediate product.

The distribution of the circumferential length L is shown in FIG. 19. The intermediate circumferential length of the shape (bold line in the figure) was set to a range between the circumferential length of the final product and 90% of that circumferential length (broken line in the figure). Furthermore, the intermediate product was designed so that its cross-sectional shape matched a set circumferential length.

Figure 20:
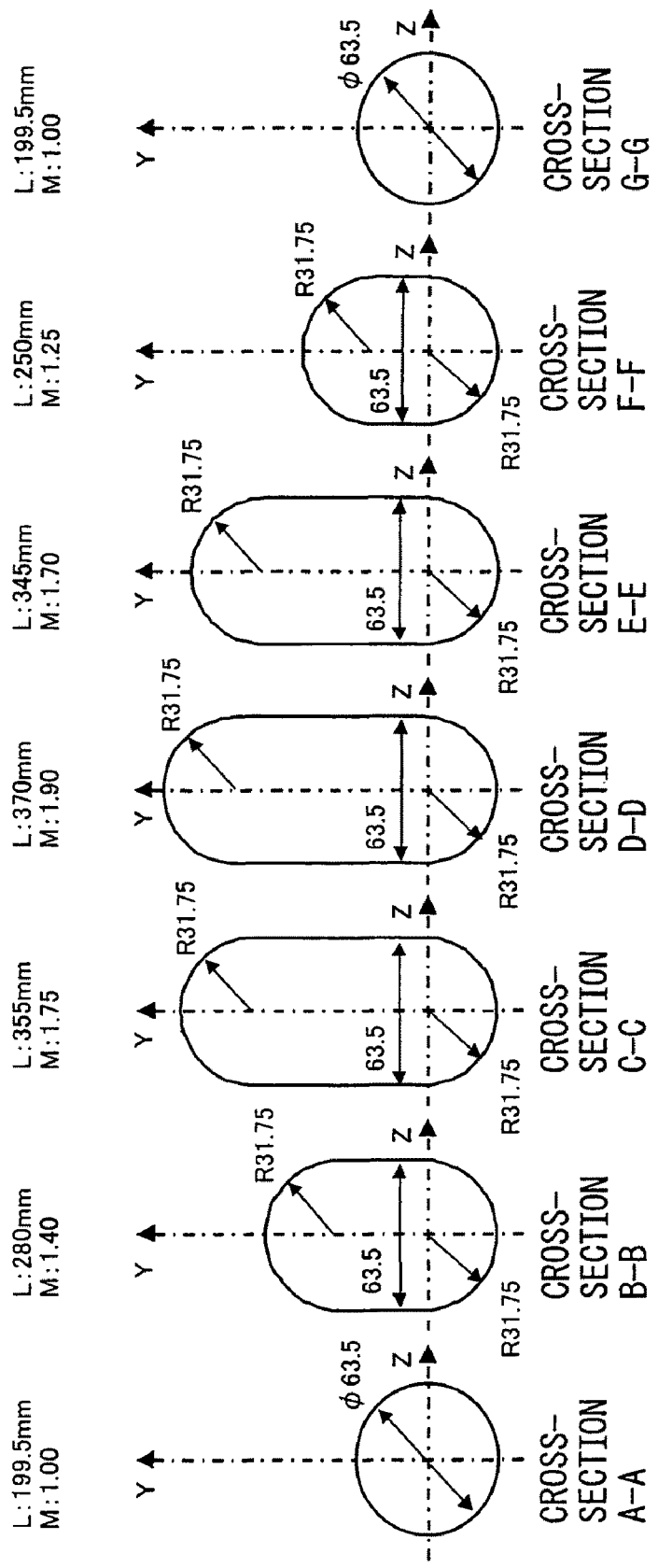
FIG. 20 is a view showing the cross-sectional (Y-Z plane) shapes of an intermediate product expanded in only one direction in the design of the shape of the intermediate product.

At that time, as shown in FIG. 20, the dimensions of the cross-sections in the Z-direction were made the same as the outside diameter of the stock pipe, that is, 63.5 mm.

Figure 21:
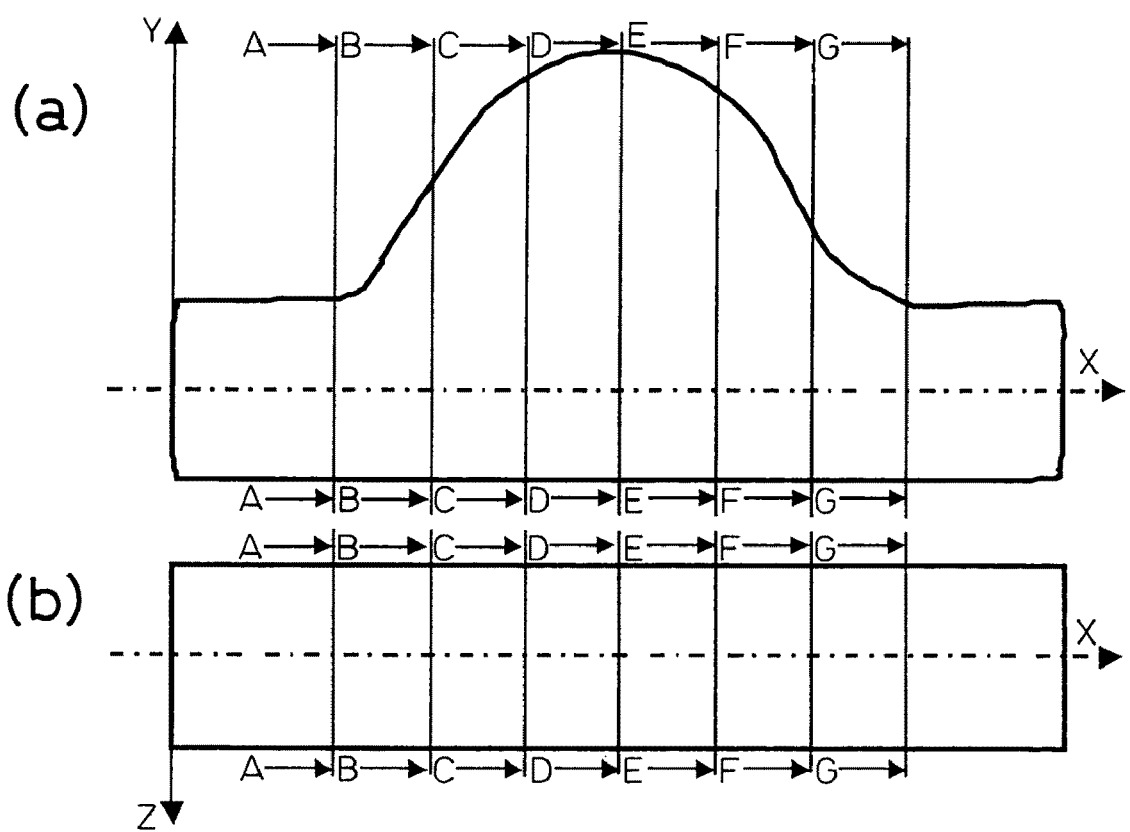
FIG. 21 are views showing the shape of an intermediate product expanded in only one direction in the design of the shape of an intermediate product. (a) shows the side surface (X-Y plane) shape, while (b) shows the top surface (X-Z plane) shape.

Furthermore, FIG. 21(a) shows the side cross-sectional (X-Y plane) shape of the metal pipe, while FIG. 21(b) shows the same changed in only the Y-direction dimension in the axial direction (X-direction) to show the shape of the top surface of the metal pipe (X-Z plane).

The final product is shaped without being expanded at the − side of Y. The intermediate product is also shaped not expanded at the − side of Y, but shaped expanded to only the + side.

Further, the cross-sectional vertical (Y-direction + side and − side) shape of the intermediate product was a semicircular shape with a radius of curvature the same as the stock pipe, that is, 31.75 mm.

Figure 22:
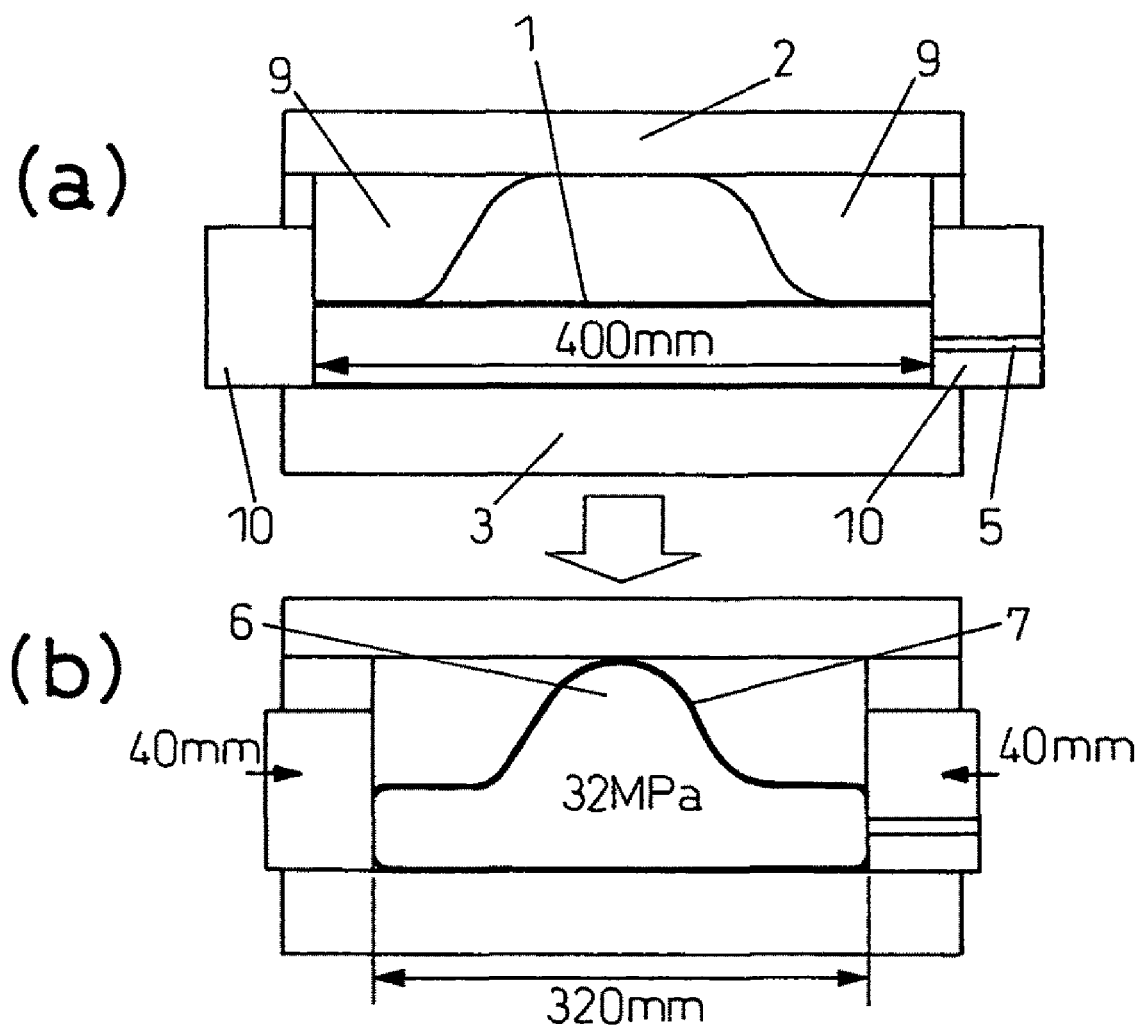
FIG. 22 are views showing the state of using a movable mold system for hydroforming (working in first hydroforming step). (a) is a view showing the state where a metal pipe (steel pipe) is gripped between a hydroforming top mold and bottom mold, while (b) is a view showing the state of pushing axial pushing punches for hydroforming.

To obtain an intermediate product of the above design, a metal pipe (steel pipe) of a total length of 400 mm was hydroformed by the movable mold system shown in FIG. 22. The pipe expansion rate was relatively large, so to suppress the reduction in thickness at the time of working as much as possible, a movable mold was used.

As shown in FIG. 22(a), a metal pipe (steel pipe) 1 is gripped between a first hydroforming top mold 2 provided with a movable mold 9 and a first hydroforming bottom mold, then, as shown in FIG. 22(b), axial pushing punches 10 are used to simultaneously push the two ends of the metal pipe 1 and the movable mold 9 in the arrow directions in the figure by 40 mm.

At this time, water was fed from the water feed ports 5 of the axial pushing punches 10 to maintain the internal pressure of the metal pipe 1 at 32 MPa.

At the time of the end of the hydroforming, the metal pipe 1 could be made into an intermediate product having a total length of 320 mm and a shape as designed (see FIGS. 18 to 21).

Figure 23:
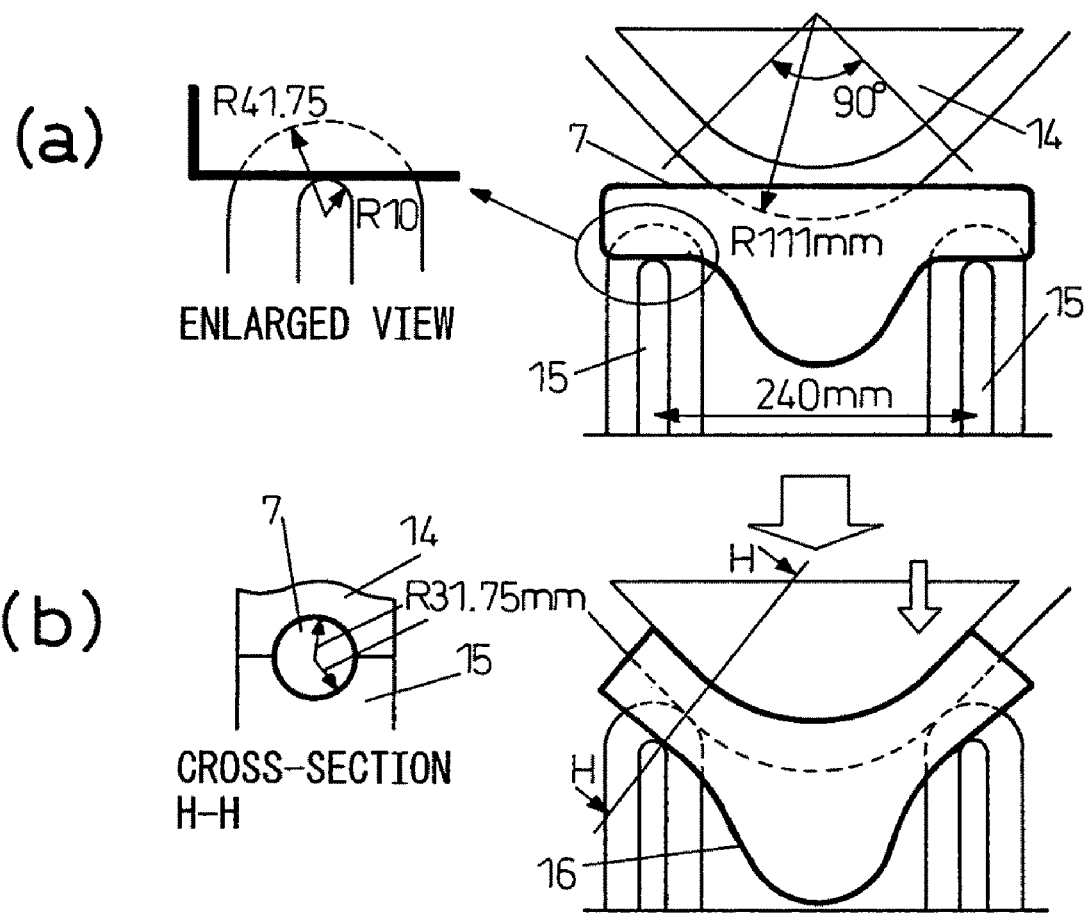
FIG. 23 are views showing a state of working an intermediate product by three-point bending press forming. (a) shows the state where the intermediate product is placed on fulcrums, while (b) shows the state of pushing down a punch from above for bending it.

Next, the intermediate product, as shown in FIG. 23, was bent by the three-point bending press forming method.

As shown in FIG. 23(*a*), the intermediate product 7 obtained at the first hydroforming step is placed on the 240 mm interval fulcrums 15, then, as shown in FIG. 23(*b*), a punch of a radius of 111 mm and an angle of 90° is pushed down from above to bend the intermediate product 7.

Note that the tops of the fulcrums 15 are shaped with the center parts at which the intermediate product 7 is placed formed into circular shapes with a radius of 10 mm. The two side parts are formed into circular shapes with a radius of 41.75 mm (see left drawing in FIG. 23(*a*)).

Further, the punch 14 and the tops of the fulcrums 15 are provided with semicircular grooves of a radius of 31.75 mm, the same as the straight pipe part of the intermediate product 7, so that the intermediate product 7 is not crushed at the time of bending (see left drawing in FIG. 23(*b*)).

By the above bending, an intermediate product 16 having an expanded part at the outer side of the bent part and having an inner side of the bent part of a curved shape with a radius of curvature of 111 mm could be obtained.

Figure 24:
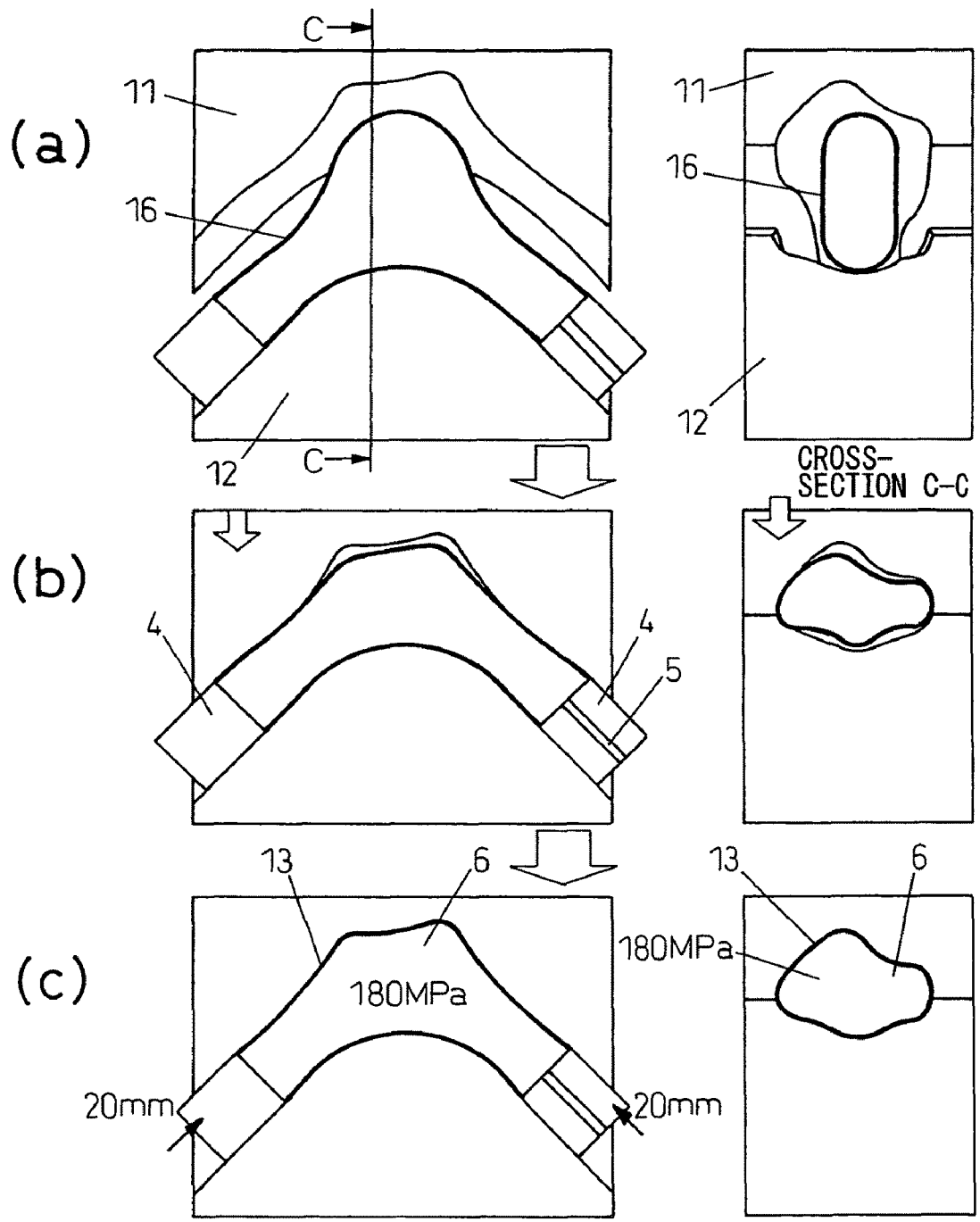
FIG. 24 are views showing a state of working an intermediate product by second hydroforming. (a) shows a state where the intermediate product is placed on a bottom mold, (b) shows the state of making the top mold descend from above for mold clamping, and (c) shows the state of pushing the axial pushing punches from the two ends and applying internal pressure.

Next, the intermediate product 16 was worked by second hydroforming by the hydroforming system shown in FIG. 24. As shown in FIG. 24(*a*), the intermediate product 16 was placed on a bottom mold 12 and, as shown in FIG. 24(*b*), a top mold 11 was made to descend from above for mold clamping. The radius of curvature of the bottom mold 12 was made 111 mm.

Finally, as shown in FIG. 24(*c*), the axial pushing punches 4 were pushed in from the two ends by 20 mm and an internal pressure of a maximum pressure of 180 MPa was applied.

Due to the above series of working, it was possible to produce the worked product of the present invention which (i) has a pipe expansion rate of the bent part of 2.00 and, further, (ii) has an expanded part of a shape greatly expanded in the middle of the bent part, with a Y-direction dimension of the cross-section of a maximum of 1.67× and a Z-direction dimension of a maximum of 2.17× with respect to the circle equivalent diameter (outside diameter) of 63.5 mm of an end of the metal pipe, at the outer side from the pipe axis of the bent part, and (iii) has an inner side of the bent part of the same radius of curvature.

Example 2

The worked product of the present invention having an expanded part at the inner side from the pipe axis of the bent part was produced. Using a metal pipe the same as the metal pipe used in Example 1 and using a mold the same as the mold used in Example 1, the pipe was worked into the same shape as in Example 1 (worked in first hydroforming step).

At the next bending step, the expanded part was positioned at the inside of the bend and bent. At that time, to prevent the expanded part from being crushed, the bending punch was provided with a recessed part into which the expanded part can fit (not shown) for the bending operation.

Finally, the expanded part was crushed and the second hydroforming mold was used for mold clamping for the hydroforming. The radius of curvature of the hydroforming mold forming the outer side of the bent part of the final product was made 111 mm at the center and was made 165 mm at positions of 45 degrees to the left and right from the center. Outside those ranges, it was changed continuously in a straight line.

As a result, it was possible to obtain a worked product of the present invention expanded to the inner side from a pipe axis of a bent part and with an outer side of the bent part of substantially the same radius of curvature. Note that the size of the expanded part, in the same way as the case of Example 1, is a Y-direction dimension of the cross-section of a maximum of 1.67× and a Z-direction dimension of a maximum of 2.17× with respect to the circle equivalent diameter (outside diameter) of 63.5 mm of an end of the metal pipe.

INDUSTRIAL APPLICABILITY

As explained above, according to the present invention, it is possible to expand the range of parts to which hydroforming can be applied compared with the past. Due to this, automobiles can be made further lighter in weight, the fuel economy can be improved, and suppression of global warming can be contributed to as well. Therefore, the present invention has a high applicability in the automobile industry.

The invention claimed is:

1. A hydroformed product obtained by integrally working a metal pipe material by cold plastic working, which product:
   - (x) has a bent part at least at one location,
   - (y1) has, at least at one location of the bent part, an expanded part of dimensions expanded in a direction toward the outer side of the bend in a cross-section vertical to a pipe axis and a direction vertical to that direction, and the expanded part in each direction has dimensions of at least 1.35× of a circle equivalent diameter of an end of the metal pipe, and
   - (z1) has an inner side of the bent part of substantially the same radius of curvature.

2. The hydroformed product as set forth in claim 1, characterized in that in the shape of the inner side of the bent part, a (maximum value of radius of curvature−minimum value of radius of curvature)/minimum value of radius of curvature is 50% or less.

3. A hydroformed product obtained by integrally working a metal pipe material by cold plastic working, which product:
   - (x) has a bent part at least at one location,
   - (y2) has, at least at one location of the bent part, an expanded part of dimensions expanded in a direction toward the inner side of the bend in a cross-section vertical to a pipe axis and a direction vertical to that direction, and the expanded part in each direction has dimensions of at least 1.35× of a circle equivalent diameter of an end of the metal pipe, and
   - (z2) has an outer side of the bent part of substantially the same radius of curvature.

4. The hydroformed product as set forth in claim 3, characterized in that in the shape of the outer side of the bent part, a (maximum value of radius of curvature−minimum value of radius of curvature)/minimum value of radius of curvature is 50% or less.

\* \* \* \* \*